(12) United States Patent
Tokuchi

(10) Patent No.: US 10,567,608 B2
(45) Date of Patent: Feb. 18, 2020

(54) INFORMATION PROCESSING APPARATUS AND NON-TRANSITORY COMPUTER READABLE MEDIUM

(71) Applicant: FUJI XEROX Co., Ltd., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/586,412

(22) Filed: May 4, 2017

(65) Prior Publication Data

US 2017/0324881 A1   Nov. 9, 2017

(30) Foreign Application Priority Data

| May 6, 2016 | (JP) | 2016-093290 |
| May 6, 2016 | (JP) | 2016-093291 |
| May 6, 2016 | (JP) | 2016-093292 |
| Jun. 29, 2016 | (JP) | 2016-128344 |
| Jun. 29, 2016 | (JP) | 2016-128350 |
| Oct. 19, 2016 | (JP) | 2016-205160 |

(51) Int. Cl.
*H04N 1/00* (2006.01)

(52) U.S. Cl.
CPC ..... *H04N 1/00973* (2013.01); *H04N 1/00251* (2013.01); *H04N 1/00267* (2013.01); *H04N 1/00307* (2013.01); *H04N 1/00344* (2013.01); *H04N 2201/0039* (2013.01); *H04N 2201/0094* (2013.01)

(58) Field of Classification Search
CPC .................................................. H04N 1/00973
See application file for complete search history.

(56) References Cited

U.S. PATENT DOCUMENTS

| 2008/0019378 A1* | 1/2008 | Hogan ................ G06F 11/3664 370/400 |
| 2008/0201492 A1* | 8/2008 | Nigorikawa ....... H04N 1/00347 710/11 |
| 2012/0105447 A1* | 5/2012 | Kim .................. H04N 21/42226 345/419 |
| 2012/0140284 A1 | 6/2012 | Tashiro et al. |
| 2014/0007199 A1 | 1/2014 | Ishino |
| 2014/0063542 A1 | 3/2014 | Aoki |
| 2014/0365655 A1 | 12/2014 | Takahashi et al. |
| 2016/0173731 A1* | 6/2016 | Mishima ............. G02B 27/017 358/1.14 |

(Continued)

FOREIGN PATENT DOCUMENTS

| JP | 2012090077 A | 5/2012 |
| JP | 2012-156872 A | 8/2012 |

(Continued)

OTHER PUBLICATIONS

Communication dated Jul. 17, 2018 from the Japanese Patent Office in counterpart Japanese application No. 2017-113023.

(Continued)

*Primary Examiner* — King Y Poon
(74) *Attorney, Agent, or Firm* — Sughrue Mion, PLLC

(57) ABSTRACT

An information processing apparatus includes a controller. The controller controls display of a function of one device if the one device is photographed and controls display of a cooperative function that uses functions of plural devices if the plural devices are photographed.

26 Claims, 21 Drawing Sheets

(56) References Cited

U.S. PATENT DOCUMENTS

2016/0269578 A1* 9/2016 Nozawa ............. H04N 1/00493

FOREIGN PATENT DOCUMENTS

| | | | |
|---|---|---|---|
| JP | 2012205134 | A | 10/2012 |
| JP | 2013062654 | A | 4/2013 |
| JP | 2013-161246 | A | 8/2013 |
| JP | 2013161246 | A | 8/2013 |
| JP | 2014-010769 | A | 1/2014 |
| JP | 2014-048672 | A | 3/2014 |
| JP | 2014-238786 | A | 12/2014 |
| JP | 2015-49570 | A | 3/2015 |
| JP | 2015055987 | A | 3/2015 |
| JP | 5737906 | B2 | 6/2015 |

OTHER PUBLICATIONS

Communication dated Apr. 25, 2017, from the Japanese Patent Office in counterpart application No. 2016-205160.
Office Action for Japanese Patent Application No. 2016-205160, dated Feb. 14, 2017.
Communication dated Aug. 14, 2018, from the Japanese Patent Office in counterpart application No. 2017-113024.
Communication dated Dec. 18, 2018, from the Japanese Patent Office in counterpart application No. 2017-113024.

* cited by examiner

FIG. 6

| DEVICE ID | NAME (TYPE) OF DEVICE | FUNCTION | IMAGE ID |
|---|---|---|---|
| A | PC | DISPLAY FUNCTION, STORAGE FUNCTION, ... | ... |
| B | MFP | PRINT FUNCTION, SCAN FUNCTION, COPY FUNCTION, FACSIMILE FUNCTION, POST-PROCESSING FUNCTION, ... | ... |
| C | PROJECTOR | PROJECTION FUNCTION, ... | ... |
| ... | ... | ... | ... |

FIG. 7

| COMBINATION OF DEVICE IDS | NAME (TYPE) OF DEVICE | COOPERATIVE FUNCTION |
|---|---|---|
| A, B | PC (A), MFP (B) | SCAN AND TRANSFER FUNCTION |
| A, B | PC (A), MFP (B) | PRINT FUNCTION |
| A, C | PC (A), PROJECTOR (C) | PROJECTION FUNCTION |
| A, C | PC (A), PROJECTOR (C) | PRINT FUNCTION |
| B, C | MFP (B), PROJECTOR (C) | PROJECTION FUNCTION |
| B, C | MFP (B), PROJECTOR (C) | PRINT FUNCTION |
| ... | ... | ... |

FIG. 25

| DEVICE ID | NAME (TYPE) OF DEVICE | PART | PART ID | FUNCTION | PART IMAGE ID |
|---|---|---|---|---|---|
| A | PC | DISPLAY PART | Aa | SCREEN DISPLAY FUNCTION | ... |
| | | BODY PART | Ab | DATA STORAGE FUNCTION | ... |
| | | ... | ... | ... | ... |
| B | MFP | BODY PART | Ba | PRINT FUNCTION | ... |
| | | READING PART | Bb | SCAN FUNCTION | ... |
| | | POST-PROCESSING APPARATUS | Bc | STAPLING FUNCTION | ... |
| | | ... | ... | ... | ... |
| C | PROJECTOR | BODY PART | Ca | PROJECTION FUNCTION | ... |
| | | ... | ... | ... | ... |
| ... | ... | ... | ... | ... | ... |

FIG. 26

| COMBINATION OF PARTS OF DEVICES | COMBINATION OF PART IDS | COOPERATIVE FUNCTION |
|---|---|---|
| DISPLAY PART OF PC (A) AND BODY PART OF MFP (B) | Aa, Ba | PRINT FUNCTION |
| | ... | ... |
| BODY PART OF MFP (B) AND BODY PART OF PROJECTOR (C) | Ba, Ca | PRINT FUNCTION |
| | ... | ... |
| READING PART OF MFP (B) AND BODY PART OF PROJECTOR (C) | Bb, Ca | SCAN AND PROJECTION FUNCTION |
| | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Applications No. 2016-093290, No. 2016-093291, and No. 2016-093292 filed May 6, 2016, No. 2016-128344, and No. 2016-128350 filed Jun. 29, 2016, and Japanese Patent Application No. 2016-205160 filed Oct. 19, 2016.

BACKGROUND

Technical Field

The present invention relates to an information processing apparatus and a non-transitory computer readable medium.

SUMMARY

According to an aspect of the invention, there is provided an information processing apparatus including a controller. The controller controls display of a function of one device if the one device is photographed and controls display of a cooperative function that uses functions of plural devices if the plural devices are photographed.

BRIEF DESCRIPTION OF THE DRAWINGS

An exemplary embodiment of the present invention will be described in detail based on the following figures, wherein:

FIG. 6 is a diagram illustrating an example of a device function management table;

FIG. 7 is a diagram illustrating an example of a cooperative function management table;

FIG. 25 is a diagram illustrating an example of a device function management table according to a fifth modification example;

FIG. 26 is a diagram illustrating an example of a cooperative function management table according to the fifth modification example;

DETAILED DESCRIPTION

Figure 1:
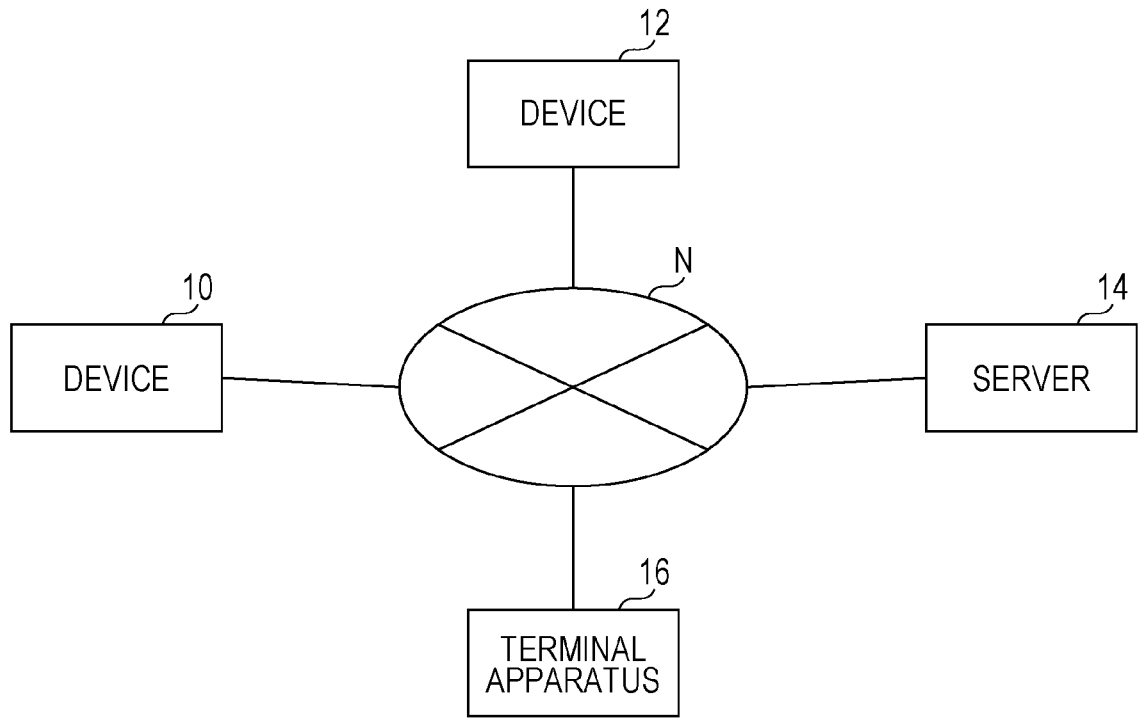
FIG. 1 is a block diagram illustrating an image forming system according to an exemplary embodiment of the present invention.

An image forming system serving as an information processing system according to an exemplary embodiment of the present invention will be described with reference to FIG. 1. FIG. 1 illustrates an example of the image forming system according to the exemplary embodiment.

The image forming system according to the exemplary embodiment includes plural devices (for example, devices 10 and 12), a server 14 which is an example of an external apparatus, and a terminal apparatus 16 which is an example of an information processing apparatus. The devices 10 and 12, the server 14, and the terminal apparatus 16 have a function of communicating with each other through a communication path N such as a network. Of course, the devices 10 and 12, the server 14, and the terminal apparatus 16 may communicate with another apparatus through different communication paths. In the example illustrated in FIG. 1, two devices (the devices 10 and 12) are included in the image forming system. Three or more devices may be included in the image forming system. Also, plural servers 14 and plural terminal apparatuses 16 may be included in the image forming system.

The devices 10 and 12 are apparatuses having a specific function and may be, for example, an image forming apparatus having an image formation function, a personal computer (PC), a projector, a display apparatus such as a liquid crystal display or a projector, a telephone, a clock, a monitoring camera, or the like. The devices 10 and 12 have a function of transmitting data to and receiving data from another apparatus. In the exemplary embodiment, it is assumed that the device 10 is an image forming apparatus, for example. The image forming apparatus (device 10) is an apparatus having at least one of a scan function, a print function, a copy function, and a facsimile function.

The server 14 is an apparatus that manages the functions of individual devices. For example, the server 14 manages the functions of individual devices and cooperative functions that use functions of plural devices. The server 14 also has a function of transmitting data to and receiving data from another apparatus.

The server 14 may manage, for each user, one or more functions available to the user. A function available to the user is, for example, a function provided to the user without charge or a function provided to the user with charge and purchased by the user. The server 14 may manage, for each user, available function information representing one or more functions available to the user (for example, function purchase history information). Of course, the server 14 does not necessarily manage functions in accordance with whether or not the functions have been purchased, because there are functions free of charge, additional update functions, and special functions managed by a manager. A function purchase process is performed by, for example, the server 14. Of course, the function purchase process may be performed by another apparatus.

The terminal apparatus 16 is an apparatus such as a PC, a tablet PC, a smartphone, or a mobile phone, and has a function of transmitting data to and receiving data from another apparatus. The terminal apparatus 16 functions as, for example, a user interface unit (UI unit) when a device is used.

In the image forming system according to the exemplary embodiment, for example, display of a function of one device is controlled if the one device is identified, and display of a cooperative function that uses functions of plural devices is controlled if the plural devices are identified. For example, display of a function of one device is controlled if the one device is photographed, and display of a cooperative function that uses functions of plural devices is controlled if the plural devices are photographed.

Hereinafter, the individual apparatuses included in the image forming system according to the exemplary embodiment will be described in detail.

Figure 2:
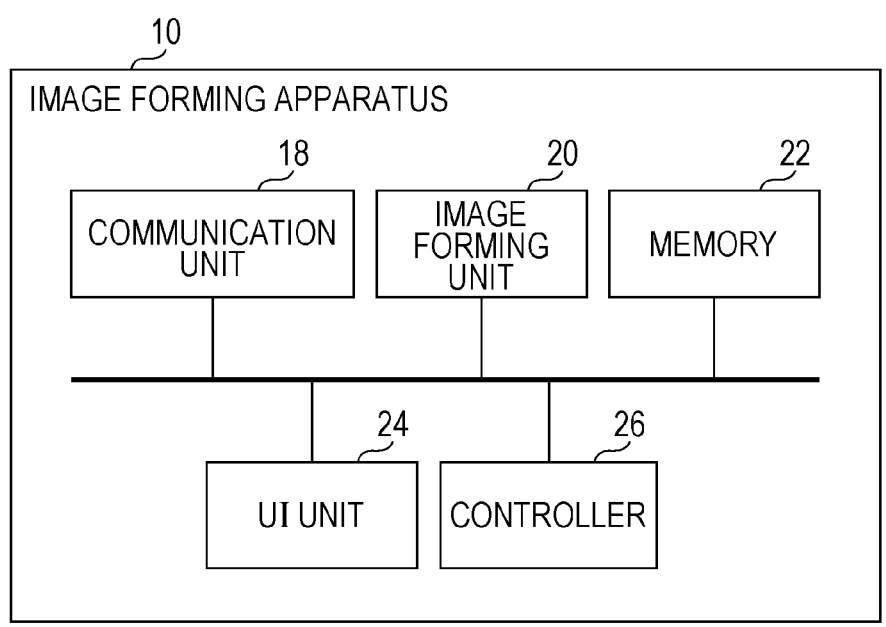
FIG. 2 is a block diagram illustrating an image forming apparatus according to the exemplary embodiment.

The configuration of the device 10 as an image forming apparatus will be described in detail with reference to FIG. 2. Hereinafter, the device 10 is referred to as an image forming apparatus 10. FIG. 2 illustrates the configuration of the image forming apparatus 10.

A communication unit 18 is a communication interface and has a function of transmitting data to another apparatus and a function of receiving data from another apparatus. The communication unit 18 may be a communication interface having a wireless communication function or may be a communication interface having a wired communication function.

An image forming unit 20 has an image formation function. Specifically, the image forming unit 20 has at least one of a scan function, a print function, a copy function, and a facsimile function. When the scan function is executed, a document is read and scan data (image data) is generated. When the print function is executed, an image is printed on a recording medium such as paper. When the copy function is executed, a document is read and printed on a recording medium. When the facsimile function is executed, image data is transmitted or received by facsimile. Furthermore, a cooperative function in which plural functions cooperate with each other may be executed. For example, a scan and transfer function, which is a combination of a scan function and a transmission (transfer) function, may be executed. When the scan and transfer function is executed, a document is read, scan data (image data) is generated, and the scan data is transmitted to a destination (for example, an external apparatus such as the terminal apparatus 16). Of course, this cooperative function is merely an example and another cooperative function may be executed.

A memory 22 is a storage apparatus such as a hard disk or a memory (for example, a solid state drive (SSD) or the like). The memory 22 stores, for example, information representing an image formation instruction (for example, job information), image data to be printed, scan data generated by executing a scan function, device address information representing the address of another device, server address information representing the address of the server 14, various pieces of control data, and various programs. Of course, these pieces of information and data may be stored in different storage apparatuses or in one storage apparatus.

A UI unit 24 is a user interface unit and includes a display and an operation unit. The display is a display apparatus such as a liquid crystal display. The operation unit is an input apparatus such as a touch screen or a keyboard. Of course, a user interface serving as both a display and an operation unit (for example, a touch display or an apparatus including a display that electronically displays a keyboard or the like) may be used. The image forming apparatus 10 does not necessarily include the UI unit 24, and may include a hardware user interface unit (hardware UI unit) serving as hardware instead of the display. The hardware UI unit is, for example, a hardware keypad dedicated to input numbers (for example, a numeric keypad) or a hardware keypad dedicated to indicate directions (for example, a direction indication keypad).

A controller 26 controls the operations of the individual units of the image forming apparatus 10.

Figure 3:
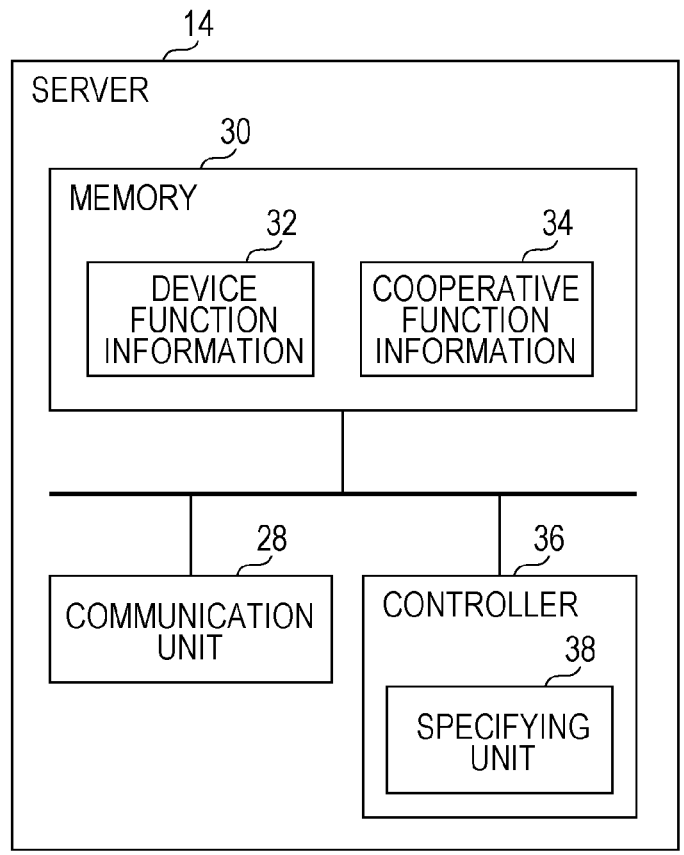
FIG. 3 is a block diagram illustrating a server according to the exemplary embodiment.

Hereinafter, the configuration of the server 14 will be described in detail with reference to FIG. 3. FIG. 3 illustrates the configuration of the server 14.

A communication unit 28 is a communication interface and has a function of transmitting data to another apparatus and a function of receiving data from another apparatus. The communication unit 28 may be a communication interface having a wireless communication function or may be a communication interface having a wired communication function.

A memory 30 is a storage apparatus such as a hard disk or a memory (for example, an SSD or the like). The memory 30 stores, for example, device function information 32, cooperative function information 34, various pieces of data, various programs, device address information representing the addresses of individual devices, and server address information representing the address of the server 14. Of course, these pieces of information and data may be stored in different storage apparatuses or in one storage apparatus. The device function information 32 and the cooperative function information 34 stored in the memory 30 may be provided to the terminal apparatus 16 periodically or at designated timing, and accordingly the information stored in the terminal apparatus 16 may be updated. Hereinafter, the device function information 32 and the cooperative function information 34 will be described.

The device function information 32 is information representing the functions of the individual devices (for example, the image forming apparatus 10 and the device 12) included in the image forming system. For example, the device function information 32 is information representing the correspondence between device identification information for identifying a device and one or more pieces of function identification information for identifying one or more functions of the device. The device identification information includes, for example, a device ID, the name of a device, information representing the type of a device, a model number, position information, and an appearance image representing the appearance of a device. The function identification information includes, for example, a function ID and the name of a function. For example, if the image forming apparatus 10 has a scan function, a print function, a copy function, and a scan and transfer function, the device identification information of the image forming apparatus 10 is associated with function identification information representing the scan function, function identification information representing the print function, function identification information representing the copy function, and function identification information representing the scan and transfer function. The functions of the individual devices are specified (identified) by referring to the device function information 32.

The cooperative function information 34 is information representing cooperative functions, each being executed through cooperation between plural functions. One or plural cooperative functions are executed through cooperation between plural functions. Each cooperative function may be executed through cooperation between plural functions of one device (for example, the image forming apparatus 10 or the device 12) or may be executed through cooperation between plural functions of plural devices (for example, the image forming apparatus 10 and the device 12). A terminal apparatus that provides an operation instruction (in the exemplary embodiment, the terminal apparatus 16) may be included in the devices to be identified, and a function of the terminal apparatus may be used as part of a cooperative function.

The cooperative function information 34 is, for example, information representing the correspondence between a combination of pieces of function identification information for identifying individual functions that are used in a cooperative function, and cooperative function identification information for identifying the cooperative function. The cooperative function identification information includes, for example, a cooperative function ID and the name of a cooperative function.

In the case of causing plural devices to cooperate with each other, the cooperative function information 34 is information representing one or more cooperative functions that use plural functions of the plural devices, and is information representing the correspondence between a combination of pieces of device identification information for identifying the individual devices that are used for the one or more cooperative functions, and cooperative function identification information.

A cooperative function may be a function executed through cooperation between plural different functions or may be a function executed through cooperation between the same functions. A cooperative function may be a function that is not available without cooperation. The function that is not available without cooperation may be a function that becomes available by combining the same functions or a function that becomes available by combining different functions among the functions of target devices that cooperate with each other. For example, the cooperation between a device having a print function (printer) and a device having a scan function (scanner) implements a copy function as a cooperative function. That is, the cooperation between the print function and the scan function implements the copy function. In this case, the copy function as a cooperative function is associated with the combination of the print function and the scan function. In the cooperative function information 34, for example, the cooperative function identification information for identifying the copy function as a cooperative function is associated with the combination of the device identification information for identifying the device having the print function and the device identification information for identifying the device having the scan function.

The memory 30 may store available function information. The available function information is information representing one or more functions available to each user, and is, for example, information representing the correspondence between user identification information for identifying a user and one or more pieces of function identification information (including cooperative function identification information) representing the one or more functions available to the user. A function available to the user is, as described above, for example, a function provided to the user without charge or a function purchased by the user, and may be a function of a single device or a cooperative function. The user identification information is, for example, user account information such as a user ID and a user name. Functions available to the individual users are specified by referring to the available function information. The available function information is updated every time a function is provided to a user (for example, every time a function is provided to a user with or without charge).

A controller 36 controls the operations of the individual units of the server 14. The controller 36 includes a specifying unit 38.

The specifying unit 38 receives device identification information for identifying a device and specifies one or more pieces of function identification information of one or more functions associated with the device identification information in the device function information 32 stored in the memory 30. Accordingly, the one or more functions of the device are specified (identified). For example, device identification information is transmitted from the terminal apparatus 16 to the server 14, and then the specifying unit 38 specifies one or more pieces of function identification information of one or more functions associated with the device identification information. Information about the one or more functions (for example, function identification information and function explanation information) is transmitted from the server 14 to the terminal apparatus 16 and is displayed on the terminal apparatus 16, for example. Accordingly, the information about the one or more functions of the device specified by the device identification information is displayed on the terminal apparatus 16.

Also, the specifying unit 38 receives pieces of device identification information for identifying target devices that cooperate with each other and specifies one or more pieces of cooperative function identification information of one or more cooperative functions associated with the combination of the pieces of device identification information in the cooperative function information 34 stored in the memory 30. Accordingly, the one or more cooperative functions that are executed through cooperation between the functions of the target devices that cooperate with each other are specified (identified). For example, plural pieces of device identification information are transmitted from the terminal apparatus 16 to the server 14, and then the specifying unit 38 specifies one or more pieces of cooperative function identification information of one or more cooperative functions associated with the plural pieces of device identification information. Information about the one or more cooperative functions (for example, cooperative function identification information and cooperative function explanation information) is transmitted from the server 14 to the terminal apparatus 16 and is displayed on the terminal apparatus 16, for example. Accordingly, the information about the one or more cooperative functions that are executed by the plural devices specified by the plural pieces of device identification information is displayed on the terminal apparatus 16.

For example, if one device is identified (for example, if one device is photographed), the specifying unit 38 receives the device identification information for identifying the device and specifies one or more pieces of function identification information of one or more functions associated with the device identification information in the device function information 32. Accordingly, if one device is identified (for example, if one device is photographed), one or more functions of the device are specified (identified). If plural devices are identified (for example, if plural devices are photographed), the specifying unit 38 receives the pieces of device identification information for identifying individual devices included in the plural devices and specifies one or more pieces of cooperative function identification information of one or more cooperative functions associated with the combination of the pieces of device identification information in the cooperative function information 34. Accordingly, if plural devices are identified (for example, if plural devices are photographed), one or more cooperative functions that use functions of the plural devices are specified (identified). In this way, the specifying unit 38 switches a function specification process in accordance with the number of identified devices (for example, in accordance with the number of photographed devices). In the terminal apparatus 16, information about one or more functions of a single device or information about one or more cooperative functions that use functions of plural devices is displayed in accordance with the number of devices that have been identified (for example, photographed). Of course, even if plural devices are photographed, the specifying unit 38 may receive pieces of device identification information of individual devices included in the plural devices and specify (identify) the functions of the individual devices by referring to the device function information 32.

If functions available to a user are managed, the specifying unit 38 may receive user identification information for identifying the user and may specify the pieces of function identification information of individual functions associated with the user identification information in the available function information stored in the memory 30. Accordingly, a group of functions available to the user is specified (identified). For example, user identification information is transmitted from the terminal apparatus 16 to the server 14, and the pieces of function identification information of individual functions associated with the user identification information are specified by the specifying unit 38. The information about the individual functions available to the user (for example, information representing the names of the individual functions) is transmitted from the server 14 to the terminal apparatus 16 and is displayed on the terminal apparatus 16, for example. Accordingly, the information about the individual functions available to the user specified by the user identification information is displayed on the terminal apparatus 16. For example, the specifying unit 38 receives device identification information and user identification information, specifies one or more pieces of function identification information of one or more functions associated with the device identification information in the device function information 32, and also specifies one or more pieces of function identification information of one or more functions associated with the user identification information in the available function information. Accordingly, the one or more functions that the device specified by the device identification information has and that are available to the user specified by the user identification information are specified.

The controller 36 may execute a function purchase process and may manage the history of the purchase. For example, if a pay function is purchased by a user, the controller 36 may apply a charging process to the user.

The controller 36 may execute functions related to image processing, such as a character recognition function, a translation function, an image processing function, and an image formation function. Of course, the controller 36 may execute a function related to processing other than image processing. When the character recognition function is executed, characters in an image are recognized and character data representing the characters is generated. When the translation function is executed, characters in an image are translated into characters expressed by a specific language and character data representing the translated characters is generated. When the image processing function is executed, an image is processed. For example, the controller 36 receives scan data generated through execution of a scan function from the image forming apparatus 10, and executes a function related to image processing, such as the character recognition function, the translation function, or the image processing function, on the scan data. The controller 36 may receive image data from the terminal apparatus 16 and execute each function on the image data. The character data or image data generated by the controller 36 is transmitted from the server 14 to the terminal apparatus 16, for example. The server 14 may be used as an external device, and a cooperative function may be a function that uses functions of plural devices including the server 14.

Figure 4:
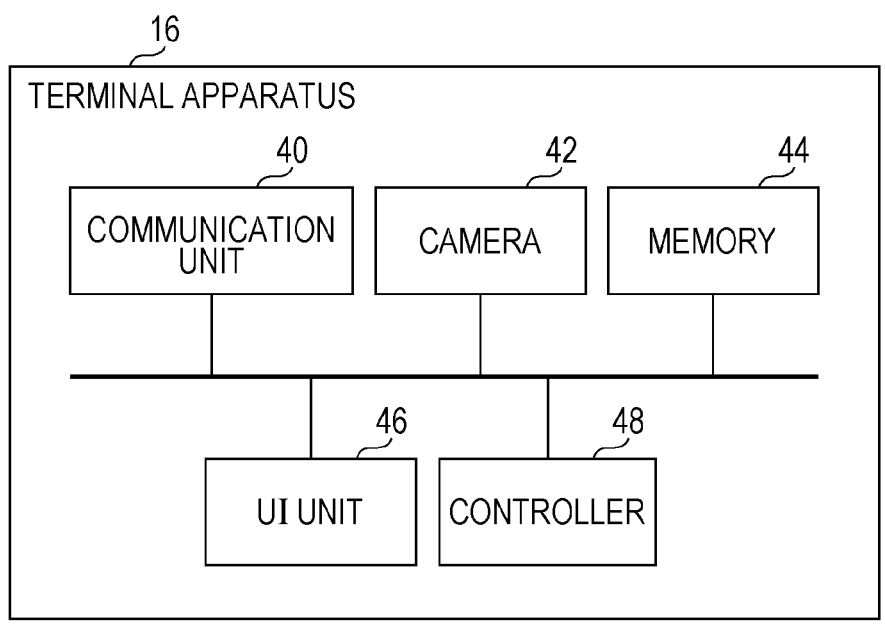
FIG. 4 is a block diagram illustrating a terminal apparatus according to the exemplary embodiment.

Hereinafter, the configuration of the terminal apparatus 16 will be described in detail with reference to FIG. 4. FIG. 4 illustrates the configuration of the terminal apparatus 16.

A communication unit 40 is a communication interface and has a function of transmitting data to another apparatus and a function of receiving data from another apparatus. The communication unit 40 may be a communication interface having a wireless communication function or may be a communication interface having a wired communication function.

A camera 42, which serves as a photographing unit, photographs a subject and thereby generates image data (for example, still image data or moving image data). Alternatively, instead of using the camera 42 of the terminal apparatus 16, image data captured by an external camera connected to a communication path such as a network may be received by the communication unit 40 and may be displayed on a UI unit 46 so that the image data may be operated by a user.

A memory 44 is a storage apparatus such as a hard disk or a memory (for example, an SSD or the like). The memory 44 stores various programs, various pieces of data, the address information of the server 14, the pieces of address information of individual devices (for example, the pieces of address information of the image forming apparatus 10 and the device 12), information about an identified device, information about identified target devices that cooperate with each other, information about a function of an identified device, and information about a cooperative function.

The UI unit 46 is a user interface unit and includes a display and an operation unit. The display is a display apparatus such as a liquid crystal display. The operation unit is an input apparatus such as a touch screen, a keyboard, or a mouse. Of course, a user interface serving as both a display and an operation unit (for example, a touch display or an apparatus including a display that electronically displays a keyboard or the like) may be used.

A controller 48 controls the operations of the individual units of the terminal apparatus 16. The controller 48 functions as, for example, a display controller (controller) and causes the display of the UI unit 46 to display various pieces of information.

The display of the UI unit 46 displays, for example, an image captured by the camera 42, an image related to a device identified as a target device to be used (for example, a device used alone or a target device that cooperates), and so forth. An image related to a device may be an image (still image or moving image) representing the device captured by the camera 42 or may be an image (for example, an icon) schematically representing the device. The data of the image schematically representing the device may be stored in the server 14 and provided from the server 14 to the terminal apparatus 16, may be stored in the terminal apparatus 16 in advance, or may be stored in another apparatus and provided from the other apparatus to the terminal apparatus 16.

The above-described device function information 32 may be stored in the memory 44 of the terminal apparatus 16. In this case, the device function information 32 is not necessarily stored in the memory 30 of the server 14. Also, the above-described cooperative function information 34 may be stored in the memory 44 of the terminal apparatus 16. In this case, the cooperative function information 34 is not necessarily stored in the memory 30 of the server 14. The controller 48 of the terminal apparatus 16 may include the above-described specifying unit 38, which may specify one or more functions of a device by identifying the device on the basis of device identification information and may specify one or more cooperative functions that use plural functions. In this case, the server 14 does not necessarily include the specifying unit 38.

If available function information is created, the available function information may be stored in the memory 44 of the terminal apparatus 16. In this case, the available function information is not necessarily stored in the memory 30 of the server 14. The controller 48 of the terminal apparatus 16 may manage a function purchase history of a user. In this case, the controller 36 of the server 14 does not necessarily have the management function therefor. The controller 48 of the terminal apparatus 16 may specify one or more functions available to a user on the basis of user identification information.

Alternatively, the device function information 32 and the cooperative function information 34 may be stored in a device such as the image forming apparatus 10 or the device 12, and a device such as the image forming apparatus 10 or the device 12 may include the specifying unit 38. That is, the process by the specifying unit 38 of the server 14 may be performed in the server 14, may be performed in the terminal apparatus 16, or may be performed in a device such as the image forming apparatus 10 or the device 12.

In the exemplary embodiment, for example, augmented reality (AR) technologies are applied to obtain device identification information and to identify a target device to be used. For example, AR technologies are applied to obtain device identification information of a device that is used alone and to identify the device, and also to obtain pieces of device identification information of the target devices that cooperate with each other and to identify the target devices. The AR technologies according to the related art are used. For example, a marker-based AR technology in which a marker such as a two-dimensional barcode is used, a markerless AR technology in which an image recognition technique is used, a position information AR technology in which position information is used, and the like are used. Of course, device identification information may be obtained and a target device to be used may be identified without applying the AR technologies. For example, in the case of a device connected to a network, the device may be identified on the basis of the IP address thereof or by reading the device ID thereof. Furthermore, in the case of devices or terminal apparatuses having various types of wireless communication function based on infrared communication, visible light communication, Wireless Fidelity (Wi-Fi, registered trademark), or Bluetooth (registered trademark), the devices that cooperate with each other by using the wireless communication function may be identified by obtaining the device IDs thereof, and a cooperative function may be executed.

Figure 5:
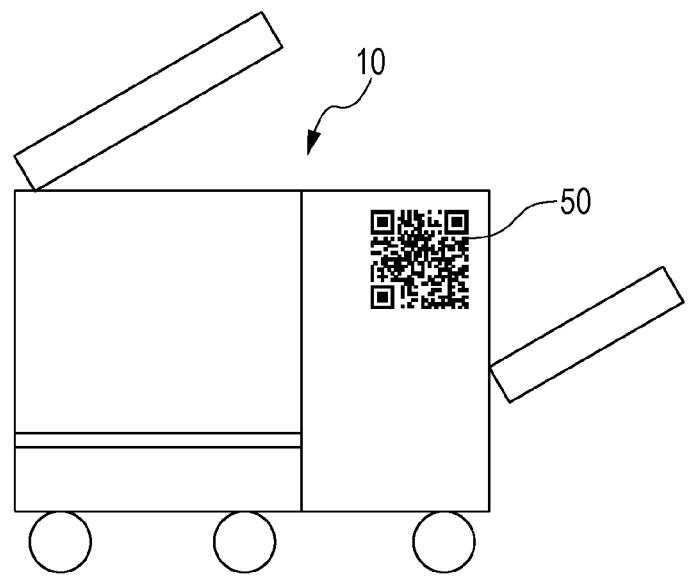
FIG. 5 is a schematic diagram illustrating an appearance of the image forming apparatus.

Hereinafter, a process of obtaining device identification information will be described in detail with reference to FIG. 5. As an example, a description will be given of the case of obtaining the device identification information of the image forming apparatus 10. FIG. 5 schematically illustrates an appearance of the image forming apparatus 10. Here, a description will be given of a process of obtaining the device identification information by applying the marker-based AR technology. The housing of the image forming apparatus 10 is attached with a marker 50, such as a two-dimensional barcode. The marker 50 is information obtained by coding the device identification information of the image forming apparatus 10. A user activates the camera 42 of the terminal apparatus 16 and photographs, with the camera 42, the marker 50 attached to the image forming apparatus 10, which is a target to be used. Accordingly, image data representing the marker 50 is generated. The image data is transmitted from the terminal apparatus 16 to the server 14, for example. In the server 14, the controller 36 performs a decoding process on the marker image represented by the image data and thereby extracts device identification information. Accordingly, the image forming apparatus 10 to be used (the image forming apparatus 10 attached with the photographed marker 50) is identified. The specifying unit 38 of the server 14 specifies the pieces of function identification information of the functions associated with the extracted device identification information in the device function information 32. Accordingly, the functions of the image forming apparatus 10 to be used are specified (identified).

Alternatively, the controller 48 of the terminal apparatus 16 may perform a decoding process on the image data representing the marker 50 to extract the device identification information. In this case, the extracted device identification information is transmitted from the terminal apparatus 16 to the server 14. The specifying unit 38 of the server 14 specifies the pieces of function identification information of the functions associated with the device identification information transmitted from the terminal apparatus 16 in the device function information 32. If the device function information 32 is stored in the memory 44 of the terminal apparatus 16, the controller 48 of the terminal apparatus 16 may specify the pieces of function identification information of the functions associated with the extracted device identification information in the device function information 32.

The marker 50 may include coded function identification information of the functions of the image forming apparatus 10. In this case, the device identification information of the image forming apparatus 10 is extracted and also the pieces of function identification information of the functions of the image forming apparatus 10 are extracted by performing a decoding process on the image data representing the marker 50. Accordingly, the image forming apparatus 10 is specified (identified) and also the functions of the image forming apparatus 10 are specified (identified). The decoding process may be performed by the server 14 or the terminal apparatus 16.

In the case of executing a cooperative function that uses functions of plural devices, markers of the target devices that cooperate with each other are photographed to obtain the pieces of device identification information of the devices, and thereby the cooperative function is specified (identified).

In the case of obtaining device identification information by applying the markerless AR technology, for example, a user photographs the whole appearance or part of the appearance of the device to be used (for example, the image forming apparatus 10) by using the camera 42 of the terminal apparatus 16. Of course, it is useful to obtain information for specifying the device to be used, such as the name (for example, the trade name) or model number of the device, by photographing the appearance of the device. As a result of the photography, appearance image data representing the whole appearance or part of the appearance of the device to be used is generated. The appearance image data is transmitted from the terminal apparatus 16 to the server 14, for example. In the server 14, the controller 36 identifies the device to be used on the basis of the appearance image data. For example, the memory 30 of the server 14 stores, for each device, appearance image correspondence information representing the correspondence between appearance image data representing the whole appearance or part of the appearance of the device and device identification information of the device. The controller 36 compares, for example, the appearance image data received from the terminal apparatus 16 with each piece of appearance image data included in the appearance image correspondence information, and specifies the device identification information of the device to be used on the basis of the comparison result. For example, the controller 36 extracts, from the appearance image data received from the terminal apparatus 16, a feature of the appearance of the device to be used, specifies the appearance image data representing a feature that is the same as or similar to the feature of the appearance in the appearance image data group included in the appearance image correspondence information, and specifies the device identification information associated with the appearance image data. Accordingly, the device to be used (the device photographed by the camera 42) is identified. For another example, if the name (for example, the trade name) or model number of the device is photographed and appearance image data representing the name or model number is generated, the device to be used may be identified on the basis of the name or model number represented by the appearance image data. The specifying unit 38 of the server 14 specifies the pieces of function identification information of the individual functions associated with the specified device identification information in the device function information 32. Accordingly, the functions of the device to be used (for example, the image forming apparatus 10) are specified.

Alternatively, the controller 48 of the terminal apparatus 16 may compare the appearance image data representing the whole appearance or part of the appearance of the device to be used (for example, the image forming apparatus 10) with each piece of appearance image data included in the appearance image correspondence information and may specify the device identification information of the device to be used on the basis of the comparison result. The appearance image correspondence information may be stored in the memory 44 of the terminal apparatus 16. In this case, the controller 48 of the terminal apparatus 16 refers to the appearance image correspondence information stored in the memory 44 of the terminal apparatus 16 and thereby specifies the device identification information of the device to be used. Alternatively, the controller 48 of the terminal apparatus 16 may obtain the appearance image correspondence information from the server 14 and may refer to the appearance image correspondence information, so as to specify the device identification information of the device to be used.

In the case of executing a cooperative function that uses functions of plural devices, the whole appearance or part of the appearance of the individual devices that cooperate with each other is photographed to obtain the pieces of device identification information of the devices, and thereby the cooperative function is specified (identified).

In the case of obtaining device identification information by applying the position information AR technology, for example, position information representing the position of a device (for example, the image forming apparatus 10) is obtained by using a Global Positioning System (GPS) function. For example, each device has a GPS function and obtains device position information representing the position of the device. The terminal apparatus 16 outputs, to the device to be used, information representing a request for obtaining device position information, and receives, as a response to the request, the device position information of the device from the device. The device position information is transmitted from the terminal apparatus 16 to the server 14, for example. In the server 14, the controller 36 identifies the device to be used on the basis of the device position information. For example, the memory 30 of the server 14 stores, for each device, position correspondence information representing the correspondence between the device position information representing the position of the device and the device identification information of the device. The controller 36 specifies, in the position correspondence information, the device identification information associated with the device position information received from the terminal apparatus 16. Accordingly, the device to be used is specified (identified). The specifying unit 38 of the server 14 specifies, in the device function information 32, the pieces of function identification information of the individual functions associated with the specified device identification information. Accordingly, the functions of the device to be used (for example, the image forming apparatus 10) are specified (identified).

The controller 48 of the terminal apparatus 16 may specify, in the position correspondence information, the device identification information associated with the position information of the device to be used. The position correspondence information may be stored in the memory 44 of the terminal apparatus 16. In this case, the controller 48 of the terminal apparatus 16 refers to the position correspondence information stored in the memory 44 of the terminal apparatus 16 and thereby specifies the device identification information of the device to be used. Alternatively, the controller 48 of the terminal apparatus 16 may obtain the position correspondence information from the server 14 and refer to the position correspondence information, so as to specify the device identification information of the device to be used.

In the case of executing a cooperative function that uses functions of plural devices, the pieces of device position information of the devices that cooperate with each other are obtained and the pieces of device identification information of the devices are specified on the basis of the pieces of device position information. Accordingly, the cooperative function is specified (identified).

Hereinafter, the image forming system according to the exemplary embodiment will be described in detail.

The device function information 32 will be described in detail with reference to FIG. 6. FIG. 6 illustrates an example of a device function management table, which is the device function information 32. In the device function management table, for example, a device ID, information representing the name of a device (for example, the type of a device), information representing one or more functions of the device (function identification information), and an image ID are associated with each other. The device ID and the name of a device correspond to an example of device identification information. The image ID is an example of image identification information for identifying an image representing a device (for example, an image representing an appearance of a device or an image schematically representing a device (for example, an icon)). The device function management table does not necessarily include the image ID. For example, the device having a device ID "B" is a multifunction peripheral (MFP, an image forming apparatus having plural image formation functions) and has a print function, a scan function, and so forth. An image ID for identifying an image representing the device is associated with the device. The data of the image representing the device is stored in, for example, the memory 30 of the server 14.

For example, with use of the AR technologies, a device ID for identifying a device to be used is obtained. The specifying unit 38 of the server 14 specifies the name of the device, one or more functions of the device, and the image ID associated with the device ID by referring to the device function management table. Accordingly, the device to be used is identified. For example, information representing the name of the device and the data of an image representing the device are transmitted from the server 14 to the terminal apparatus 16 and then they are displayed on the UI unit 46 of the terminal apparatus 16. The image representing the device is displayed as an image related to the device. Of course, an image captured by the camera 42 may be displayed on the UI unit 46 of the terminal apparatus 16. If the image related to the device (for example, an image captured by the camera 42 or an image schematically representing the device) is designated by a user on the UI unit 46 of the terminal apparatus 16, information about one or more functions of the device (for example, function identification information or function explanation information) may be transmitted from the server 14 to the terminal apparatus 16 and may be displayed on the UI unit 46 of the terminal apparatus 16.

Next, the cooperative function information 34 will be described in detail with reference to FIG. 7. FIG. 7 illustrates an example of a cooperative function management table, which is the cooperative function information 34. In the cooperative function management table, for example, a combination of device IDs, information representing the names (types) of target devices that cooperate with each other, and information representing one or more cooperative functions (cooperative function identification information) are associated with each other. For example, the device having a device ID "A" is a personal computer (PC), and the device having a device ID "B" is an MFP. The cooperation between the PC (A) and the MFP (B) implements, for example, a scan and transfer function and a print function as cooperative functions. The scan and transfer function is a function of transferring image data generated through scanning by the MFP (B) to the PC (A). The print function is a function of transmitting data (for example, image data or document data) stored in the PC (A) to the MFP (B) and printing the data by the MFP (B).

Figure 8:
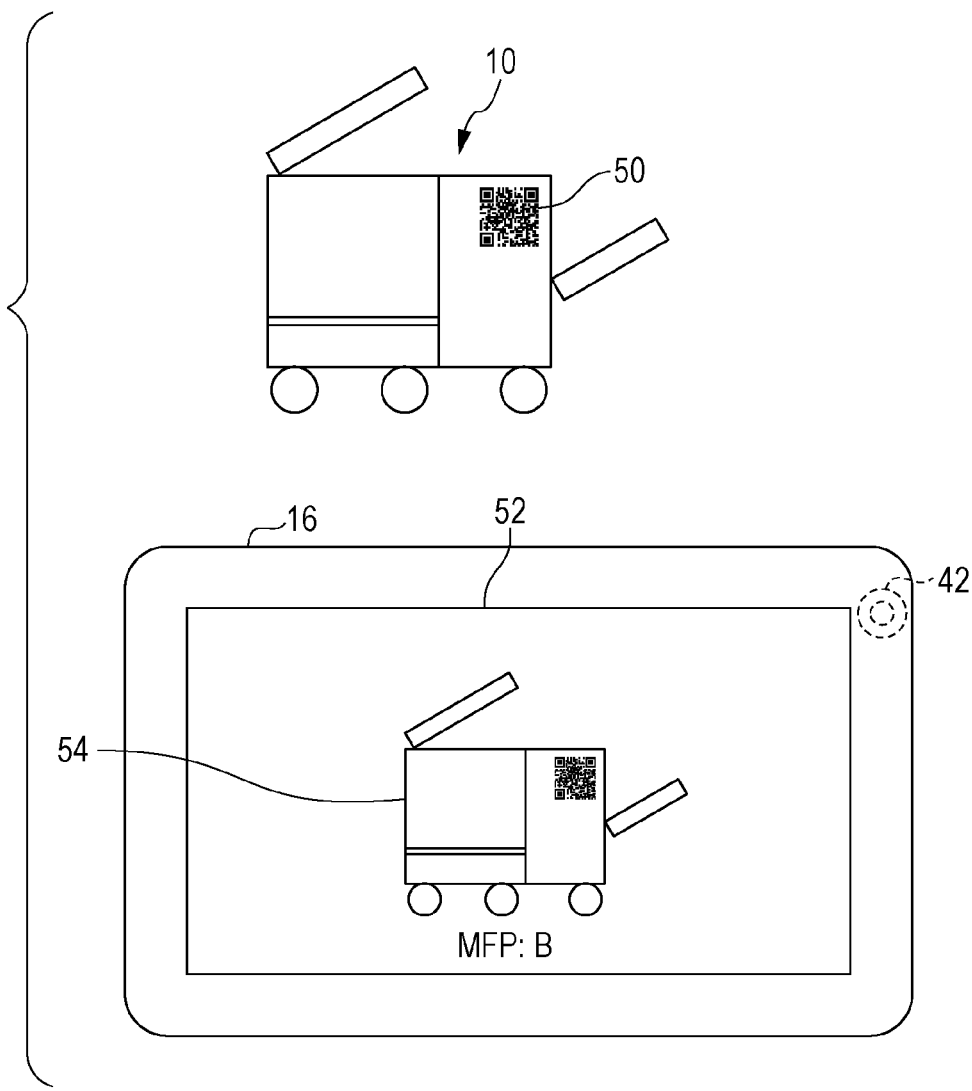
FIG. 8 is a diagram illustrating a device that is used alone.

Hereinafter, a description will be given of a process in a case where a device is used alone, with reference to FIG. 8. FIG. 8 illustrates an example of a device that is used alone. For example, it is assumed that the image forming apparatus 10 is the device that is used alone. The image forming apparatus 10 is, for example, an MFP. The image forming apparatus 10 is a device that exists in real space. The terminal apparatus 16 illustrated in FIG. 8 is a device that exists in real space and is, for example, a mobile terminal apparatus such as a smartphone or mobile phone.

For example, the housing of the image forming apparatus 10 is attached with the marker 50, such as a two-dimensional barcode. In a case where the marker-based AR technology or the markerless AR technology is used, a user photographs, with the camera 42 of the terminal apparatus 16 (for example, a smartphone), the image forming apparatus 10 to be used. Accordingly, image data representing the marker 50 or appearance image data representing an appearance of the image forming apparatus 10 is generated. A device display screen 52 is displayed on a display of the UI unit 46 of the terminal apparatus 16, and a device image 54 related to the image forming apparatus 10 is displayed on the device display screen 52. The device image 54 is, for example, an image generated through photography by the camera 42 (having an original size at the photography or an increased or decreased size).

The image data generated through photography by the camera 42 is transmitted from the terminal apparatus 16 to the server 14. In the server 14, the controller 36 performs a decoding process on the image data to extract the device identification information of the image forming apparatus 10, and accordingly the image forming apparatus 10 is identified. Alternatively, appearance image data representing an appearance of the image forming apparatus 10 may be generated, and the appearance image data may be transmitted from the terminal apparatus 16 to the server 14. In this case, in the server 14, the controller 36 specifies the device identification information of the image forming apparatus 10 by referring to the appearance image correspondence information. Accordingly, the image forming apparatus 10 is identified.

The specifying unit 38 of the server 14 specifies (identifies) the functions of the image forming apparatus 10 by referring to the device function information 32 (for example, the device function management table illustrated in FIG. 6). This will be described in detail with reference to FIG. 6. It is assumed that the image forming apparatus 10 is an "MFP (B)", for example. The specifying unit 38 specifies the functions associated with the MFP (B) in the device function management table illustrated in FIG. 6. Accordingly, the functions of the MFP (B) are specified. The information about the specified functions is transmitted from the server 14 to the terminal apparatus 16. Of course, the process for identifying a device and a function may be performed by the terminal apparatus 16.

On the device display screen 52, a prepared image related to the identified image forming apparatus 10 (not an image obtained through photography but a schematic image (for example, an icon)) or an image generated through photography by an external camera may be displayed as the device image 54, instead of the image generated through photography by the camera 42.

For example, in the case of using image data obtained by photographing a device, the appearance of the device in a current state (for example, an appearance including a scratch, note, sticker attached to the device, and so forth) is reflected in the image, and thus a user may be able to visually recognize the difference from another device of the same type more clearly.

In the case of using a schematic image, the data of the schematic image is transmitted from the server 14 to the terminal apparatus 16, for example. For example, when the image forming apparatus 10 is identified, the specifying unit 38 of the server 14 specifies the schematic image related to the image forming apparatus 10 by referring to the device function management table (device function information 32) illustrated in FIG. 6. The data of the schematic image is transmitted from the server 14 to the terminal apparatus 16, and the schematic image is displayed as the device image 54 on the device display screen 52. The data of the schematic image may be stored in the terminal apparatus 16 in advance. In this case, when the image forming apparatus 10 is identified, the device image 54 stored in the terminal apparatus 16 is displayed on the device display screen 52. The data of the schematic image may be stored in an apparatus other than the server 14 and the terminal apparatus 16.

Also, when a device is identified, information representing the name of the device may be transmitted from the server 14 to the terminal apparatus 16, and the name of the device may be displayed on the device display screen 52 in the terminal apparatus 16. In the example illustrated in FIG. 8, the image forming apparatus 10 is an MFP, and the name thereof "MFP (B)" is displayed.

Figure 9:
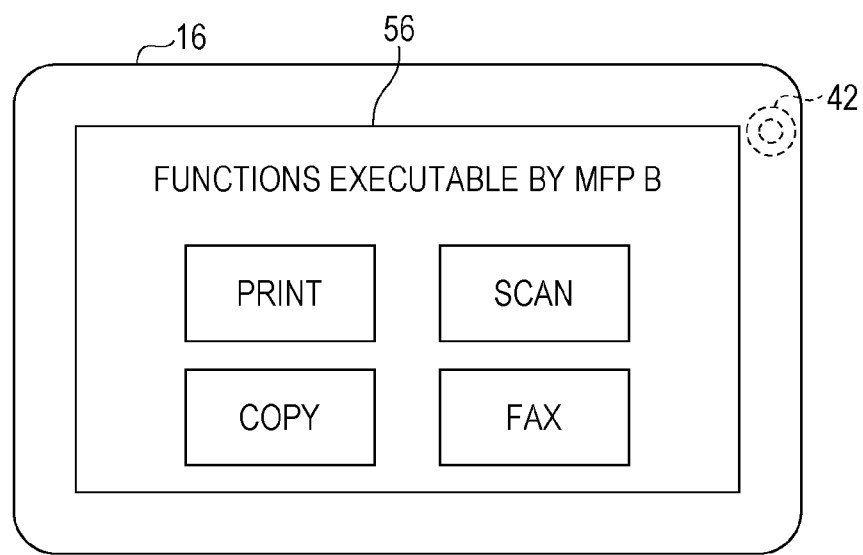
FIG. 9 is a diagram illustrating an example of a function display screen.

After the functions of the image forming apparatus 10 are specified, the controller 48 of the terminal apparatus 16 causes the UI unit 46 of the terminal apparatus 16 to display a function display screen 56 and causes information about the functions to be displayed on the function display screen 56, as illustrated in FIG. 9. As the information about the functions, for example, button images to be used for providing an instruction to execute the functions are displayed. The MFP (B) as the image forming apparatus 10 has, for example, a print function, a scan function, a copy function, and a facsimile function, and thus button images to be used for providing an instruction to execute these functions are displayed on the function display screen 56. For example, if a user designates the button image representing the print function by using the terminal apparatus 16 and provides an instruction to execute the print function, execution instruction information representing an instruction to execute the print function is transmitted from the terminal apparatus 16 to the image forming apparatus 10. The execution instruction information includes control data for executing the print function, data such as image data to which the print function is applied, and so forth. In response to receipt of the execution instruction information, the image forming apparatus 10 executes printing in accordance with the execution instruction information.

Figure 10:
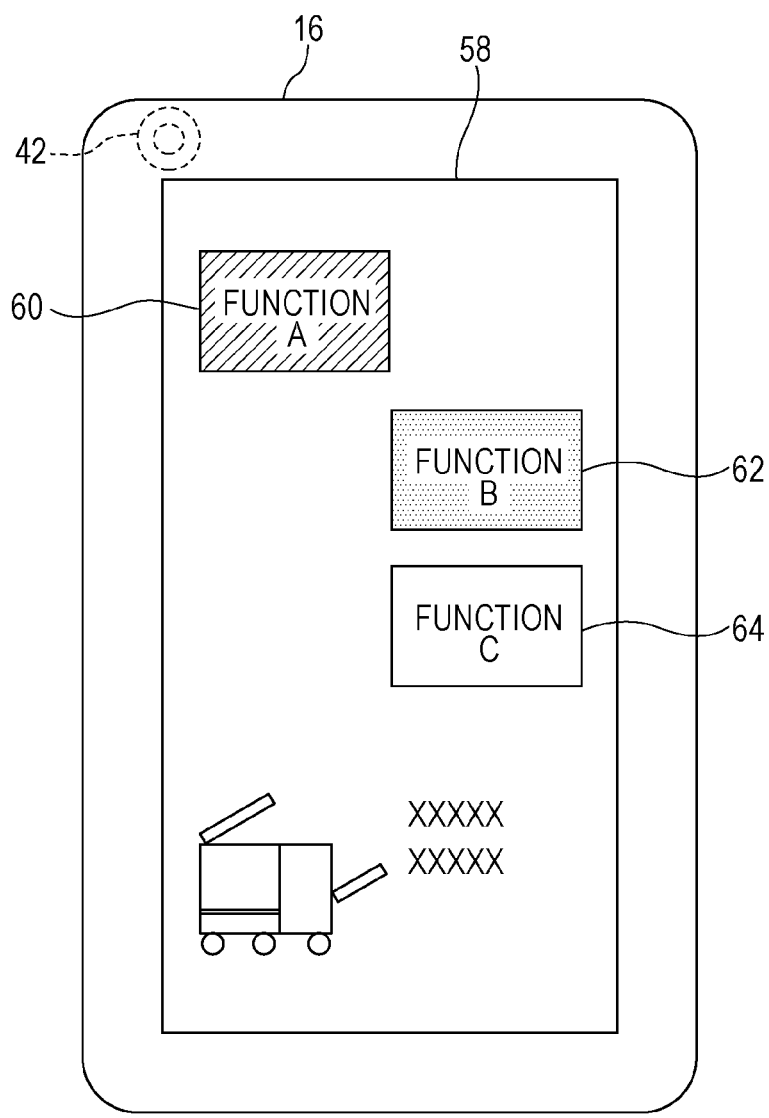
FIG. 10 is a diagram illustrating an example of a function display screen.

FIG. 10 illustrates another example of a function display screen. A function display screen 58 is a screen that is displayed on the UI unit 46 of the terminal apparatus 16 in the case of using a single device, as illustrated in FIG. 8. As described above, the device to be used (for example, the image forming apparatus 10) is specified and the functions of the device to be used are specified. The function identification information representing the function associated with the user identification information of the user who uses the target device, that is, the function available to the user may be specified. Furthermore, since the functions of the device to be used are specified, a function that the device to be used does not have among a group of functions to be provided may be specified. These pieces of information may be displayed on the function display screen 58.

On the function display screen 58 illustrated in FIG. 10, a button image 60 representing function A, a button image 62 representing function B, and a button image 64 representing function C are displayed as an example of pieces of function identification information. Function A is a function of the device to be used (for example, the identified image forming apparatus 10) and is a function available to the user. Function B is a function of the device to be used and is a function unavailable to the user. The user becomes able to use function B by being provided with function B. If function B is a pay function, the user becomes able to use function B by purchasing function B. If function B is a free function, the user becomes able to use function B by being provided with function B without charge. Function C is a function that the device to be used does not have, that is, a function incompatible with the device to be used. In accordance with whether or not the function represented by a button image is a function of the device to be used, the controller 48 of the terminal apparatus 16 may change the display form of the button image. Also, in accordance with whether or not the function represented by a button image is a function available to the user, the controller 48 may change the display form of the button image. For example, the controller 48 may change the color or shape of each button image. In the example illustrated in FIG. 10, the button images 60, 62, and 64 are displayed in different colors. For example, a button image representing a function that the device to be used has and that is available to the user (for example, the button image 60 representing function A) is displayed in blue. A button image representing a function that the device to be used has and that is unavailable to the user (for example, the button image 62 representing function B) is displayed in yellow. A button image representing a function that the device to be used does not have (for example, the button image 64 representing function C) is displayed in gray. Alternatively, the controller 48 may change the shapes of the button images 60, 62, and 64, or may change the fonts of the function display names. Of course, the display form may be changed in another method. Accordingly, the user may be able to recognize the availability of each function with enhanced visibility.

For example, if the user designates the button image 60 representing function A by using the terminal apparatus 16 and provides an instruction to execute function A, execution instruction information representing an instruction to execute function A is transmitted from the terminal apparatus 16 to the target device to be used. The execution instruction information includes control data for executing function A, image data to be subjected to the process by function A, and so forth. In response to receipt of the execution instruction information, the target device executes function A in accordance with the execution instruction information. For example, if the target device is the image forming apparatus 10 and if function A is a scan and transfer function, the image forming unit 20 of the image forming apparatus 10 executes a scan function to generate scan data (image data). The scan data is then transmitted from the image forming apparatus 10 to a destination that is set (for example, the terminal apparatus 16).

If the user designates the button image 62 representing function B by using the terminal apparatus 16 and provides an instruction to provide function B, a provision process is performed. If the provision process is performed by the server 14, the terminal apparatus 16 accesses the server 14. Accordingly, a screen for being provided with function B (for example, a website), which is information enabling the user to use function B, is displayed on the UI unit 46 of the terminal apparatus 16. By taking a provision procedure on the screen, the user becomes able to use function B. For example, the terminal apparatus 16 stores a program of a web browser. With use of the web browser, the user is able to access the server 14 from the terminal apparatus 16. When the user accesses the server 14 by using the web browser, a function provision screen (for example, a website) is displayed on the UI unit 46 of the terminal apparatus 16, and the user is provided with the function through the website. Of course, the provision process may be performed by a server different from the server 14. Alternatively, as the information enabling the user to use function B, a usage permission request screen (for example, a website) for requesting the use of function B to a manager or the like may be displayed on the UI unit 46 of the terminal apparatus 16. If the user requests permission to use function B to the manager or the like through the usage permission request screen and if the permission is obtained, the user is able to use function B.

Figure 11:
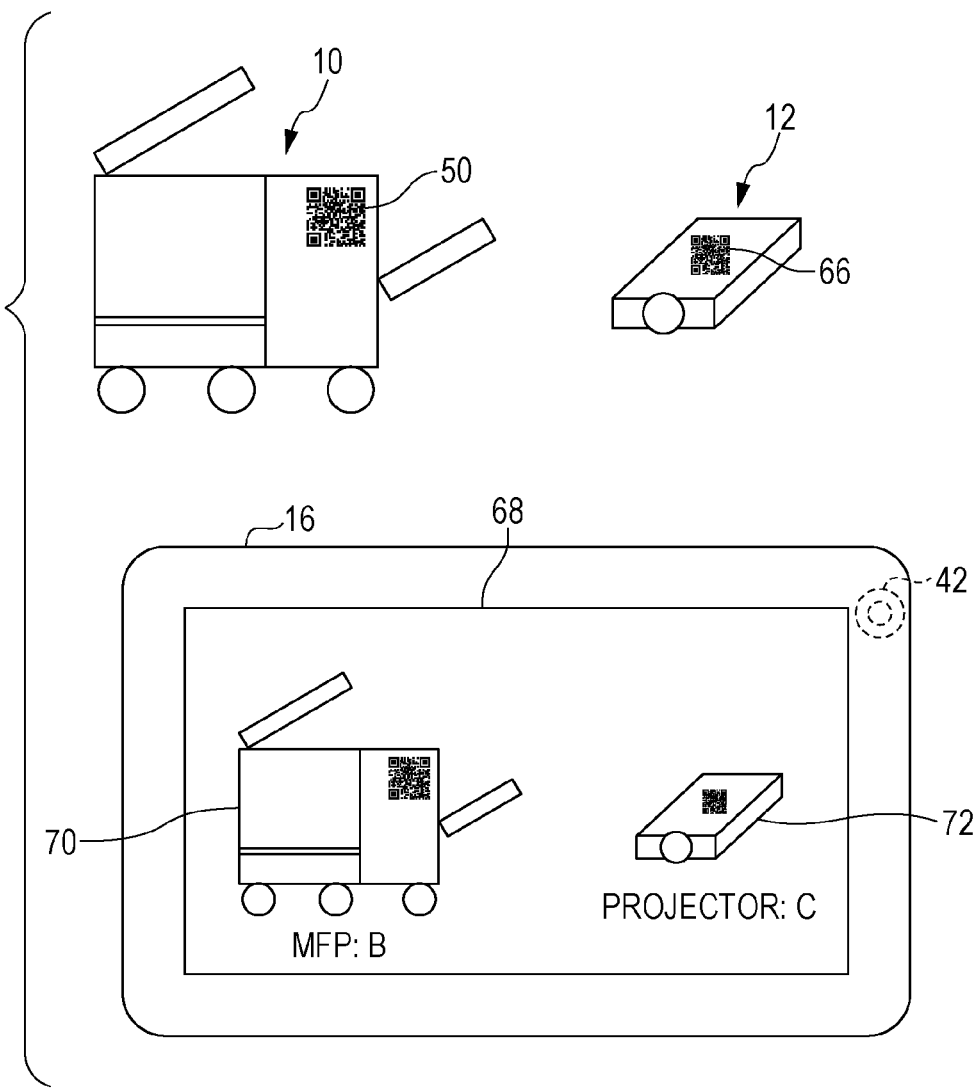
FIG. 11 is a diagram illustrating target devices that cooperate with each other.

Hereinafter, a description will be given of a process in a case where a cooperative function is used. FIG. 11 illustrates an example of target devices that cooperate with each other. For example, it is assumed that the image forming apparatus 10 and a projector as the device 12 (hereinafter referred to as a projector 12) are used as the target devices. The image forming apparatus 10, the projector 12, and the terminal apparatus 16 are devices that exist in real space.

For example, the marker 50 such as a two-dimensional barcode is attached to the housing of the image forming apparatus 10, and a marker 66 such as a two-dimensional barcode is attached to the housing of the projector 12. The marker 66 is information obtained by coding the device identification information of the projectors 12. If the marker-based AR technology or the markerless AR technology is used, a user photographs, by using the camera 42 of the terminal apparatus 16 (for example, a smartphone), the image forming apparatus 10 and the projector 12 as the target devices that cooperate with each other. In the example illustrated in FIG. 11, the image forming apparatus 10 and the projector 12 are photographed together in a state where both the image forming apparatus 10 and the projector 12 are within the field of view of the camera 42. Accordingly, image data representing the markers 50 and 66 is generated. A device display screen 68 is displayed on the display of the UI unit 46 of the terminal apparatus 16. On the device display screen 68, a device image 70 related to the image forming apparatus 10 and a device image 72 related to the projector 12 are displayed. The device images 70 and 72 are images generated through, for example, photography by the camera 42 (having an original size at the photography or an increased or decreased size).

The image data generated through photography by the camera 42 is transmitted from the terminal apparatus 16 to the server 14. In the server 14, the controller 36 performs a decoding process on the image data to extract the device identification information of the image forming apparatus 10 and the device identification information of the projector 12, and accordingly the image forming apparatus 10 and the projector 12 are identified. Alternatively, appearance image data representing appearances of the image forming apparatus 10 and the projector 12 may be generated and transmitted from the terminal apparatus 16 to the server 14. In this case, in the server 14, the controller 36 specifies the device identification information of the image forming apparatus 10 and the device identification information of the projector 12 by referring to the appearance image correspondence information. Accordingly, the image forming apparatus 10 and the projector 12 are identified.

The specifying unit 38 of the server 14 specifies (identifies) one or more cooperative functions that use a function of the image forming apparatus 10 and a function of the projector 12 by referring to the cooperative function information 34 (for example, the cooperative function management table illustrated in FIG. 7). This will be described in detail with reference to FIG. 7. It is assumed that, for example, the image forming apparatus 10 is an MFP (B) and the projector 12 is a projector (C). The specifying unit 38 specifies the cooperative functions associated with the combination of the MFP (B) and the projector (C) in the cooperative function management table illustrated in FIG. 7. Accordingly, the cooperative functions that are executed through cooperation between the MFP (B) and the projector (C) are specified. The information about the specified cooperative functions is transmitted from the server 14 to the terminal apparatus 16. Of course, the process for identifying a device and a cooperative function may be performed by the terminal apparatus 16.

On the device display screen 68, a prepared image related to the identified image forming apparatus 10 (for example, a schematic image such as an icon) or an image generated through photography by an external camera may be displayed as the device image 70, instead of the image generated through photography by the camera 42. Also, a prepared image related to the identified projector 12 or an image generated through photography by an external camera may be displayed as the device image 72. The data of the schematic image may be transmitted from the server 14 to the terminal apparatus 16, may be stored in advance in the terminal apparatus 16, or may be stored in another apparatus, as described above.

When a device is identified, information representing the name of the device may be transmitted from the server 14 to the terminal apparatus 16, and the name of the device may be displayed on the device display screen 68 in the terminal apparatus 16. In the example illustrated in FIG. 11, the name "MFP (B)" of the image forming apparatus 10 and the name "projector (C)" of the projector 12 are displayed.

If plural devices are photographed, the specifying unit 38 of the server 14 may specify the functions of the individual devices by referring to the device function information 32. In the example illustrated in FIG. 11, the specifying unit 38 may specify the functions of the image forming apparatus 10 and the functions of the projector 12. The information about the specified functions may be transmitted from the server 14 to the terminal apparatus 16.

Figure 12:
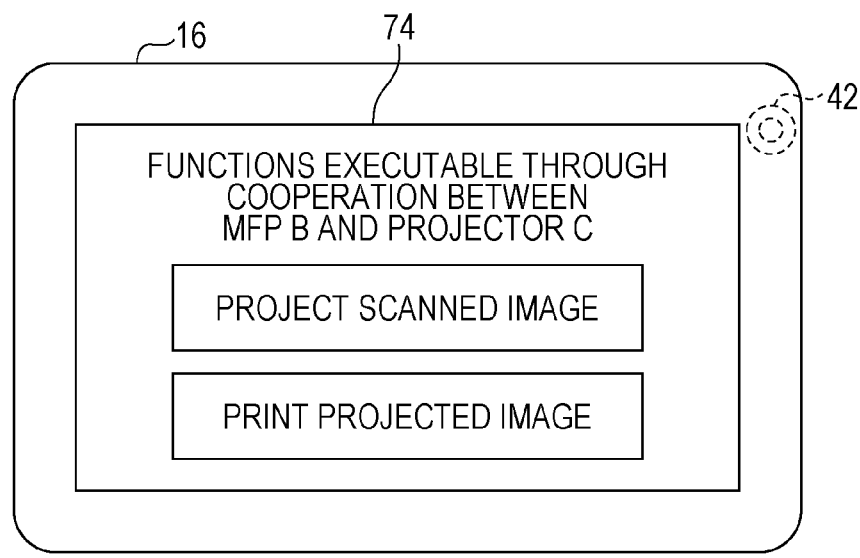
FIG. 12 is a diagram illustrating an example of a function display screen.

After the cooperative functions are specified, the controller 48 of the terminal apparatus 16 causes the UI unit 46 of the terminal apparatus 16 to display a function display screen 74 and causes information about the cooperative functions to be displayed on the function display screen 74, as illustrated in FIG. 12. As the information about the cooperative functions, for example, button images to be used for providing an instruction to execute the cooperative functions are displayed. The cooperation between the MFP (B) and the projector (C) enables execution of a cooperative function in which an image generated through scanning by the MFP (B) is projected by the projector (C) and a cooperative function in which an image projected by the projector (C) is printed by the MFP (B). The button images to be used for providing an instruction to execute these cooperative functions are displayed on the function display screen 74. For example, if the user designates a button image by using the terminal apparatus 16 and provides an instruction to execute a cooperative function, execution instruction information representing an instruction to execute the cooperative function is transmitted from the terminal apparatus 16 to the image forming apparatus 10 and the projector 12. In response to receipt of the execution instruction information, the image forming apparatus 10 and the projector 12 execute the cooperative function designated by the user.

The target devices that cooperate with each other may be designated by a user operation. For example, as a result of photographing, by using the camera 42, the image forming apparatus 10 and the projector 12, the device image 70 related to the image forming apparatus 10 and the device image 72 related to the projector 12 are displayed on the UI unit 46 of the terminal apparatus 16, as illustrated in FIG. 11. An image related to a device may be an image obtained through photography by the camera 42 or may be a prepared image related to an identified device (for example, a schematic image such as an icon). If the user designates the device images 70 and 72 on the device display screen 68, the image forming apparatus 10 and the projector 12 are designated as the target devices that cooperate with each other. For example, if the user designates the device image 70, the marker-based AR technology or the markerless AR technology is applied to the device image 70 and thereby the image forming apparatus 10 is specified (identified). Likewise, if the user designates the device image 72, the marker-based AR technology or the markerless AR technology is applied to the device image 72 and thereby the projector 12 is specified (identified). Accordingly, the cooperative functions that are executed by the image forming apparatus 10 and the projector 12 are specified, and the information about the cooperative functions is displayed on the UI unit 46 of the terminal apparatus 16.

For another example, the user may touch the device image 70 on the device display screen 68 by using, for example, his/her finger, and may move the finger to the device image 72, so as to designate the device images 70 and 72 and to designate the image forming apparatus 10 and the projector 12 as the target devices that cooperate with each other. The order in which the user touches the device images 70 and 72 or the movement direction of the finger may be opposite to the above-described example. Of course, an indication unit that is moved on the device display screen 68 other than the finger, such as a pen, may be used. Furthermore, the target devices that cooperate with each other may be designated by drawing circles thereon, or the target devices may be designated by designating the device images related to the devices within a predetermined period. In the case of cancelling cooperation, the user may designate the target device to be cancelled on the device display screen 68 or may press a cooperation cancellation button. If an image of a device that is not the target device of cooperation is on the device display screen 68, the user may designate the device on the device display screen 68 to eliminate the device from the target devices that cooperate with each other. The device to be cancelled may be designated by performing a predetermined operation, such as drawing a cross mark thereon.

The target devices that cooperate with each other may be separately photographed. For example, the target devices that cooperate with each other are identified by performing photography by the camera 42 plural times. If the photography by the camera 42 is performed plural times, the device identification information of the device identified in each photographing operation is stored in the memory of the server 14 or the terminal apparatus 16. For example, the image forming apparatus 10 is photographed in a state where the image forming apparatus 10 is within the field of view of the camera 42, and then the projector 12 is photographed in a state where the projector 12 is within the field of view of the camera 42. Accordingly, image data representing the image forming apparatus 10 and image data representing the projector 12 are generated. By applying the marker-based AR technology or the markerless AR technology to each piece of image data, the image forming apparatus 10 and the projector 12 are specified (identified), and the cooperative functions that use the functions of the image forming apparatus 10 and the projector 12 are specified (identified). For example, the image forming apparatus 10 and the projector 12 as the target devices that cooperate with each other are not always located close to each other within the field of view of the camera 42. The angle of view of the camera 42 may be changed or the field of view may be increased or decreased. If these operations are insufficient, photography may be performed plural times to identify the target devices that cooperate with each other.

For another example, a target device that cooperates may be set in advance as a basic cooperative device. For example, it is assumed that the image forming apparatus 10 is set in advance as a basic cooperative device. The device identification information of the basic cooperative device may be stored in the memory of the server 14 or the terminal apparatus 16 in advance. Alternatively, a user may designate a basic cooperative device by using the terminal apparatus 16. If a basic cooperative device is set, the user photographs a target device other than the basic cooperative device by using the camera 42 of the terminal apparatus 16. Accordingly, the target devices that cooperate with each other are specified (identified), and one or more cooperative functions that use functions of the basic cooperative device and the photographed device are specified (identified).

If a photographed device is not identified even if the AR technologies or the like are applied, the device image representing the photographed device is not necessarily displayed on the device display screen. Accordingly, the visibility of an identified device may increase. For example, if there are an identified device and an unidentified device and if both the devices have been photographed by the camera 42, the device image representing the unidentified device is not displayed. Accordingly, the device image representing the identified device is displayed while being distinguished from the device image representing the unidentified device, and thus the visibility of the identified device may increase. Alternatively, the device image representing the identified device may be displayed in a highlighted manner. For example, the device image representing the identified device may be displayed in a specific color, may be displayed by highlighting the edge of the device image, may be displayed by enlarging the device image, may be displayed three-dimensionally, or may be displayed by blinking the device image. Accordingly, the visibility of the identified device may increase.

Hereinafter, a detailed description will be given of switching control between display of a function in which a single device is used alone (hereinafter referred to as a "single-device function") and display of a cooperative function.

For example, if only one device is identified within a predetermined identification period, the controller 48 of the terminal apparatus 16 causes the UI unit 46 of the terminal apparatus 16 to display information about one or more functions of the one device (for example, the image forming apparatus 10) as single-device function information. The length of the identification period may be changed by a user. The device may be identified by applying the AR technologies or other technologies. The process of identifying the device may be performed by the server 14 or the terminal apparatus 16. The starting point of the identification period may be, for example, a time point at which the one device is identified or a time point designated by the user (for example, a time point at which an identification process is started).

For example, if another device is not identified within the identification period from the time point at which the one device is identified, the controller 48 of the terminal apparatus 16 causes the UI unit 46 of the terminal apparatus 16 to display information about one or more functions of the one device as single-device function information. In this case, the one device is handled as a device identified within the identification period. The information about the device may be information transmitted from the server 14 to the terminal apparatus 16 or information stored in the terminal apparatus 16 in advance.

For another example, if only one device is identified within an identification period which starts from a time point designated by a user, the controller 48 of the terminal apparatus 16 causes the UI unit 46 of the terminal apparatus 16 to display information about one or more functions of the one device as single-device function information.

For another example, if an instruction to display a single-device function is provided after one device is identified, the controller 48 of the terminal apparatus 16 may cause the UI unit 46 of the terminal apparatus 16 to display information about one or more functions of the one device as single-device function information. The controller 48 of the terminal apparatus 16 causes a button image to be used for providing an instruction to display a single-device function to be displayed on the device display screen 52 illustrated in FIG. 8, constantly or if one device is photographed (or if one device is identified). If the button image is pressed by a user, the controller 48 causes the UI unit 46 to display information about one or more functions of the one device.

The controller 48 of the terminal apparatus 16 may cause the UI unit 46 of the terminal apparatus 16 to display a confirmation screen when the identification period has elapsed. The confirmation screen is, for example, a screen used by a user to provide an instruction to extend the identification period. If the user provides an instruction to extend the identification period through the confirmation screen and if another device is not photographed within the extended period, the controller 48 of the terminal apparatus 16 causes the UI unit 46 of the terminal apparatus 16 to display information about one or more functions of the identified device.

A further description will be given of display control of information about a single-device function. For example, it is assumed that a device is identified by using the marker-based AR technology or the markerless AR technology. For example, if only one device is photographed within a predetermined photography period, the controller 48 of the terminal apparatus 16 causes the UI unit 46 of the terminal apparatus 16 to display information about one or more functions of the one device as single-device function information. The starting point of the photography period may be a time point at which the one device is photographed or a time point designated by a user (for example, photography starting point). The length of the photography period may be changed by the user. After the one device is photographed, the one device is identified by using the marker-based AR technology or the markerless AR technology. The identification process may be performed by the server 14 or the terminal apparatus 16.

For example, if another device is not photographed within the photography period from the time point at which the one device is photographed, the controller 48 of the terminal apparatus 16 causes the UI unit 46 of the terminal apparatus 16 to display information about one or more functions of the one device as single-device function information. In this case, the one device is handled as a device photographed within the photography period.

For another example, if only one device is photographed within a photography period which starts from a time point designated by a user, the controller 48 of the terminal apparatus 16 causes the UI unit 46 of the terminal apparatus 16 to display information about one or more functions of the one device as single-device function information.

For another example, if an instruction to display a single-device function is provided after one device is photographed, the controller 48 of the terminal apparatus 16 may cause the UI unit 46 of the terminal apparatus 16 to display information about one or more functions of the one device as single-device function information.

For example, if only one device is photographed within a photography period (for example, if a second device is not photographed within a photography period from a time point at which a first device is photographed or if only one device is photographed within a photography period from a starting point designated by a user), the controller 48 of the terminal apparatus 16 transmits image data generated through the photography to the server 14. The photography period may be measured by the controller 48 or a timer. The specifying unit 38 of the server 14 specifies (identifies) a device on the basis of the image data and specifies one or more functions of the device. Information about the one or more functions is transmitted from the server 14 to the terminal apparatus 16 and is displayed on the UI unit 46 of the terminal apparatus 16. Of course, the server 14 may manage the time instead of the terminal apparatus 16 and may transmit information about one or more functions of an identified device to the terminal apparatus 16.

The controller 48 of the terminal apparatus 16 may cause the UI unit 46 of the terminal apparatus 16 to display a confirmation screen when the photography period has elapsed. The confirmation screen is, for example, a screen used by a user to provide an instruction to extend the photography period. If the user provides an instruction to extend the photography period through the confirmation screen and if another device is not photographed within the extended period, the controller 48 of the terminal apparatus 16 transmits image data obtained through the photography to the server 14 and causes the UI unit 46 of the terminal apparatus 16 to display one or more functions of the one device. The length of the extended period may be changed by the user.

For another example, if an instruction to display a single-device function is provided after one device is photographed, the controller 48 of the terminal apparatus 16 may transmit image data generated through the photography to the server 14 and accordingly may receive information about one or more functions of the photographed device from the server 14.

For still another example, the controller 48 of the terminal apparatus 16 may transmit image data to the server 14 every time image data is generated by photographing a device, and accordingly may receive information about one or more functions of the photographed device from the server 14. In this case, if only one device is photographed within a photography period, the controller 48 of the terminal apparatus 16 causes the UI unit 46 of the terminal 16 to display information about the one device as single-device function information.

On the other hand, if plural devices are identified within an identification period, the controller 48 of the terminal apparatus 16 causes the UI unit 46 of the terminal apparatus 16 to display information about one or more cooperative functions that use functions of the plural devices identified within the identification period. If the identification period is extended, the controller 48 of the terminal apparatus 16 causes the UI unit 46 of the terminal apparatus 16 to display information about one or more cooperative functions that use functions of plural devices identified within the identification period including the extended period. The plural devices identified within the identification period are designated as target devices that cooperate with each other. The information about the cooperative functions may be information transmitted from the server 14 to the terminal apparatus 16 or may be information stored in the terminal apparatus 16 in advance.

For example, if a second device is identified within an identification period from a time point at which a first device is identified, the controller 48 of the terminal apparatus 16 causes the UI unit 46 of the terminal apparatus 16 to display information about one or more cooperative functions that use functions of plural devices including the first device and the second device. In this case, the first device is also handled as a device identified within the identification period.

Also, if a second device is identified within an identification period from a time point at which a first device is identified, the controller 48 of the terminal apparatus 16 may set a new identification period which starts from a time point at which the second device is identified. The same applies to the following period, that is, if a third device is identified within the new identification period, another new identification period is set. In this case, the controller 48 of the terminal apparatus 16 causes the UI unit 46 of the terminal apparatus 16 to display information about one or more cooperative functions that use functions of plural devices (including the first device) identified within all the identification periods.

For another example, if plural devices are photographed within an identification period which starts from a time point designated by a user, the controller 48 of the terminal apparatus 16 causes the UI unit 46 of the terminal apparatus 16 to display information about one or more cooperative functions that use functions of the plural devices.

For another example, if an instruction to display a cooperative function is provided after plural devices are identified, the controller 48 of the terminal apparatus 16 may cause the UI unit 46 of the terminal apparatus 16 to display information about one or more cooperative functions that use functions of the plural devices. The controller 48 of the terminal apparatus 16 causes a button image to be used for providing an instruction to display one or more cooperative functions to be displayed on the device display screen 68, constantly or if plural devices are photographed (or if plural devices are identified). If the button image is pressed by a user, the controller 48 causes the UI unit 46 to display information about one or more cooperative functions that use functions of the plural devices.

For another example, if a second device is identified during a period in which an instruction to execute a function of a first device is not provided after the first device is identified, the controller 48 of the terminal apparatus 16 may cause the UI unit 46 of the terminal apparatus 16 to display information about one or more cooperative functions that use functions of the plural devices. For example, as illustrated in FIG. 9 or 10, if the second device is photographed before a user provides an instruction to execute a function in a state where the function display screen 56 or 58 is displayed on the UI unit 46 of the terminal apparatus 16, the controller 48 of the terminal apparatus 16 causes the UI unit 46 of the terminal apparatus 16 to display information about one or more cooperative functions that use a function of the first device and a function of the second device.

A further description will be given of display control of information about a cooperative function. For example, it is assumed that plural devices are identified by using the marker-based AR technology or the markerless AR technology. For example, if plural devices are photographed within a predetermined photography period, the controller 48 of the terminal apparatus 16 causes the UI unit 46 of the terminal apparatus 16 to display information about one or more cooperative functions that use functions of the plural devices photographed within the photography period. If the photography period is extended, the controller 48 of the terminal apparatus 16 causes the UI unit 46 of the terminal apparatus 16 to display information about one or more cooperative functions that use functions of plural devices photographed within the photography period including the extended period. The plural devices photographed within the photography period are designated as target devices that cooperate with each other. After the plural devices are photographed, the plural devices are identified by using the marker-based AR technology or the markerless AR technology. The identification process may be performed by the server 14 or the terminal apparatus 16.

For example, if a second device is photographed within a photography period from a time point at which a first device is photographed, the controller 48 of the terminal apparatus 16 causes the UI unit 46 of the terminal apparatus 16 to display information about one or more cooperative functions that use functions of plural devices including the first device and the second device. In this case, the first device is also handled as a device photographed within the photography period.

Also, if a second device is photographed within a photography period from a time point at which a first device is photographed, the controller 48 of the terminal apparatus 16 may set a new photography period which starts from a time point at which the second device is photographed. The same applies to the following period, that is, if a third device is photographed within the new photography period, another new photography period is set. In this case, the controller 48 of the terminal apparatus 16 causes the UI unit 46 of the terminal apparatus 16 to display information about one or more cooperative functions that use functions of plural devices (including the first device) photographed within all the photography periods.

For another example, if plural devices are photographed within a photography period which starts from a time point designated by a user, the controller 48 of the terminal apparatus 16 causes the UI unit 46 of the terminal apparatus 16 to display information about one or more cooperative functions that use functions of the plural devices.

For another example, if an instruction to display a cooperative function is provided after plural devices are photographed, the controller 48 of the terminal apparatus 16 may cause the UI unit 46 of the terminal apparatus 16 to display information about one or more cooperative functions that use functions of the plural devices.

For another example, if a second device is photographed during a period in which an instruction to execute a function of a first device is not provided after the first device is photographed, the controller 48 of the terminal apparatus 16 may cause the UI unit 46 of the terminal apparatus 16 to display information about one or more cooperative functions that use functions of the plural devices. For example, as illustrated in FIG. 9 or 10, if the second device is photographed before a user provides an instruction to execute a function in a state where the function display screen 56 or 58 is displayed on the UI unit 46 of the terminal apparatus 16, the controller 48 of the terminal apparatus 16 causes the UI unit 46 of the terminal apparatus 16 to display information about one or more cooperative functions that use a function of the first device and a function of the second device.

For example, if plural devices are photographed within a photography period (for example, if a second device is photographed within a photography period from a time point at which a first device is photographed or if plural devices are photographed within a photography period from a starting point designated by a user), the controller 48 of the terminal apparatus 16 transmits plural pieces of image data generated through the photography to the server 14. The specifying unit 38 of the server 14 specifies (identifies) the individual devices on the basis of the pieces of image data and specifies one or more cooperative functions that use functions of the plural identified devices. Information about the one or more cooperative functions is transmitted from the server 14 to the terminal apparatus 16 and is displayed on the UI unit 46 of the terminal apparatus 16. Of course, one or more functions of each single device may be specified and information about the one or more functions of each single device may be transmitted from the server 14 to the terminal apparatus 16 and may be displayed on the UI unit 46 of the terminal apparatus 16.

For another example, if an instruction to display a cooperative function is provided after plural devices are photographed, the controller 48 of the terminal apparatus 16 may transmit plural pieces of image data generated through the photography to the server 14 and accordingly may receive information about one or more cooperative functions that use functions of the plural photographed devices from the server 14.

For another example, if a second device is photographed before an instruction to execute a function of a first device is provided after the first device is photographed, the controller 48 of the terminal apparatus 16 may transmit plural pieces of image data generated through the photography to the server 14 and accordingly may receive information about one or more cooperative functions that use functions of the plural photographed devices from the server 14.

For another example, the controller 48 of the terminal apparatus 16 may transmit image data to the server 14 every time a device is photographed and image data is generated, and accordingly may receive information about one or more cooperative functions that use functions of the plural photographed devices from the server 14. In this case, if plural devices are photographed within a photography period, the controller 48 of the terminal apparatus 16 may cause the UI unit 46 of the terminal apparatus 16 to display information about one or more cooperative functions that use functions of the plural devices.

Hereinafter, a description will be given of another display example of information about functions.

Figure 13:
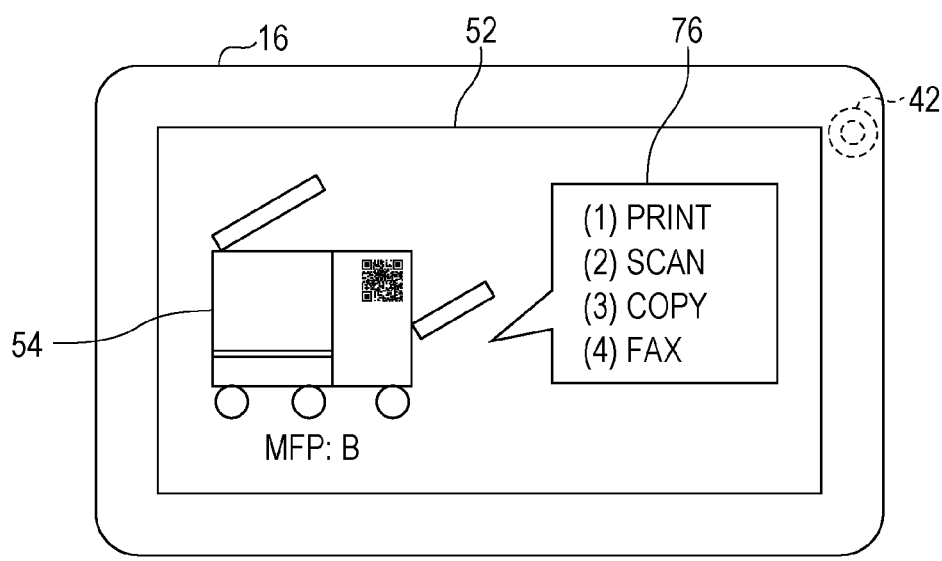
FIG. 13 is a diagram illustrating an example of a device display screen.

FIG. 13 illustrates a display example of single-device functions. The controller 48 of the terminal apparatus 16 causes the UI unit 46 of the terminal apparatus 16 to display the device display screen 52 and causes the device image 54 representing a photographed image (for example, the image forming apparatus 10) and information about one or more functions of the device to be displayed on the device display screen 52. In the example illustrated in FIG. 13, information about the functions of the image forming apparatus 10 (for example, the names of the functions) is displayed in a balloon-shaped display area 76. The shape of the display area 76 is merely an example, and a display area 76 having another shape may be displayed. Upon information about a function displayed in the display area 76 being designated by a user and upon an instruction to execute the function being given, the designated function is executed.

Figure 14:
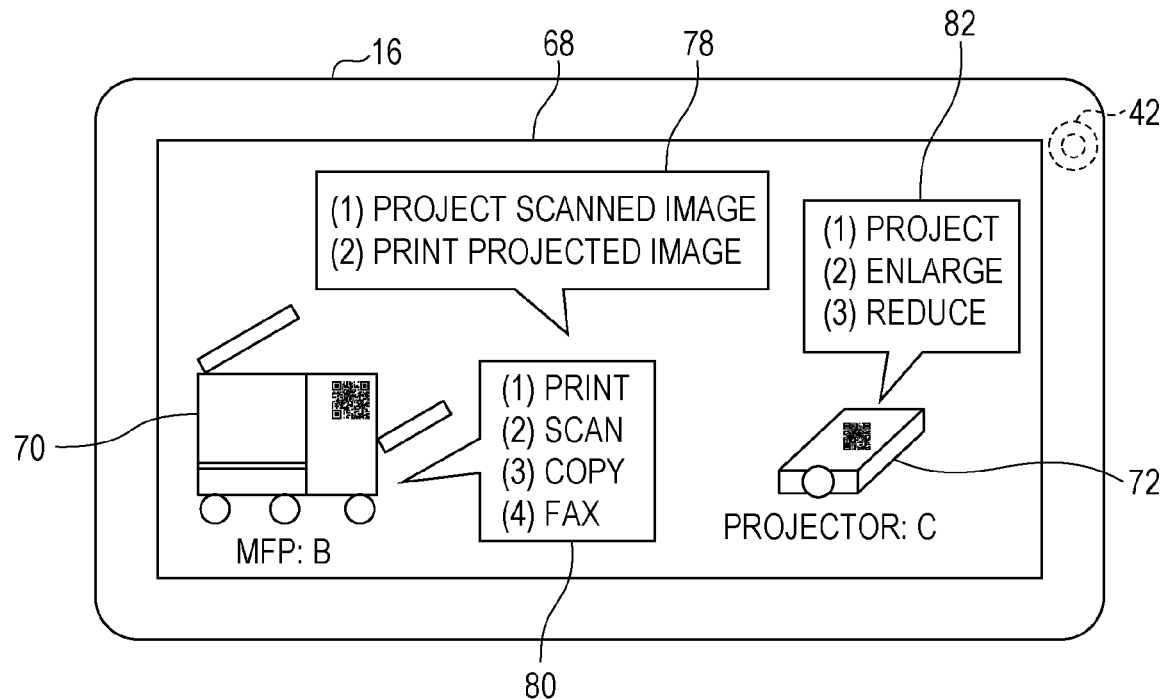
FIG. 14 is a diagram illustrating an example of a device display screen.

FIG. 14 illustrates a display example of cooperative functions. The controller 48 of the terminal apparatus 16 causes the UI unit 46 of the terminal apparatus 16 to display the device display screen 68 and causes the device images 70 and 72 representing plural photographed devices (for example, the image forming apparatus 10 and the projector 12) to be displayed on the device display screen 68. Furthermore, the controller 48 of the terminal apparatus 16 causes information about one or more cooperative functions that use functions of the plural devices to be displayed on the device display screen 68. In the example illustrated in FIG. 14, information about the cooperative functions (for example, the names or explanations of the cooperative functions) is displayed in a balloon-shaped display area 78. The shape of the display area 78 is merely an example, and a display area 78 having another shape may be displayed. Upon information about a cooperative function displayed in the display area 78 being designated by a user and upon an instruction to execute the cooperative function being given, the designated cooperative function is executed.

Alternatively, the controller 48 of the terminal apparatus 16 may cause information about one or more single-device functions of individual target devices that cooperate with each other to be displayed on the device display screen 68. In the example illustrated in FIG. 14, information about the functions of the image forming apparatus 10 is displayed in a balloon-shaped display area 80, and information about the functions of the projector 12 is displayed in a balloon-shaped display area 82. The controller 48 of the terminal apparatus 16 may cause information about cooperative functions and information about single-device functions to be displayed on the device display screen 68 such that the both pieces of information are distinguished from each other. For example, the display area 78 may be displayed in a color different from that of the display areas 80 and 82, or the shape of the display area 78 may be different from that of the display areas 80 and 82. For another example, the display positions of the display areas 78, 80, and 82 may be different between a single-device function and a cooperative function. For example, the display area 80 is displayed near the device image 70 corresponding thereto, the display area 82 is displayed near the device image 72 corresponding thereto, and the display area 78 is displayed at a position away from the device images 70 and 72 relative to the display areas 80 and 82. As a result of displaying the display areas 78, 80, and 82 such that the display area 78 is distinguished from the display areas 80 and 82, a user may easily distinguish a single-device function and a cooperative function from each other.

The controller 48 of the terminal apparatus 16 may control display of information about a single-device function and display of information about a cooperative function in accordance with an instruction from a user. For example, if the user designates a device image (for example, the device image 70), the controller 48 of the terminal apparatus 16 may cause information about one or more functions of the device related to the designated device image (for example, the image forming apparatus 10) to be displayed on the device display screen 68. If the user designates a device image and provides an instruction to display a single-device function, the controller 48 of the terminal apparatus 16 may cause information about one or more functions of the device related to the designated device image to be displayed on the device display screen 68. If the user designates plural device images (for example, the device images 70 and 72), the controller 48 of the terminal apparatus 16 may cause information about one or more cooperative functions that use functions of the plural devices related to the plural designated device images (for example, the image forming apparatus 10 and the projector 12) to be displayed on the device display screen 68. For example, if a first device image is designated by the user and then a second device image is designated by the user within a predetermined period, the controller 48 of the terminal apparatus 16 causes information about one or more cooperative functions that use functions of plural devices related to the plural device images to be displayed on the device display screen 68. For another example, if the user designates plural device images and provides an instruction to display a cooperative function, the controller 48 of the terminal apparatus 16 may cause information about one or more cooperative functions that use functions of plural devices related to the designated plural device images to be displayed on the device display screen 68.

As described above, according to the exemplary embodiment, if one device is identified (for example, photographed), information about one or more functions of the one device is displayed, and if plural devices are identified (for example, photographed), information about one or more cooperative functions that use functions of the plural devices is displayed. Accordingly, information about one or more functions executable by using the identified (for example, photographed) device or devices is provided to the user, which may be convenient for the user.

Furthermore, a cooperative function makes it possible to execute a function that is not executable by a single device alone, which may be convenient.

Because a single-device function or cooperative function becomes available only by identifying a device or devices by applying the AR technologies, each function is available through a simple operation compared to a case where a user manually makes settings for executing a function, and the time and effort of the user may reduce.

According to the exemplary embodiment, in an environment where plural users use plural devices, information about a single-device function or information about a cooperative function is appropriately displayed on the terminal apparatus 16. For example, even if a user interface such as a touch screen is removed from a device, the terminal apparatus 16 is used as a user interface. In another case, for example, if a device is temporarily used by a user on the go, a user interface suitable for the user, that is, a user interface displaying one or more functions of a device designated by the user or one or more cooperative functions that use the device is implemented by the terminal apparatus 16.

In the above-described exemplary embodiment, a description has been given of a cooperative function that uses two devices. Of course, the cooperative function may be a function that uses three or more devices.

Even if plural devices are identified (for example, photographed), a device designated by a user may be excluded from target devices that cooperate with each other.

First Modification Example

Hereinafter, a first modification example will be described. In the first modification example, it is assumed that plural devices are identified and information about one or more cooperative functions is displayed. Each device may be identified by using the AR technologies or other technologies as in the above-described exemplary embodiment. The process for identifying a device may be performed by the server 14 or the terminal apparatus 16.

In the first modification example, the controller 48 of the terminal apparatus 16 changes a cooperative function in accordance with the display positions of device images on the device display screen 68 and causes the UI unit 46 of the terminal apparatus 16 to display information about the cooperative function. For example, the order in which the devices are used in a cooperative function is changed in accordance with the display positions of the device images, and the controller 48 of the terminal apparatus 16 causes the UI unit 46 of the terminal apparatus 16 to display information about the cooperative function according to the order of usage. In other words, the order in which data is moved between the devices used in the cooperative function is changed in accordance with the display positions of the device images, and the controller 48 of the terminal apparatus 16 causes the UI unit 46 of the terminal apparatus 16 to display information about the cooperative function according to the order of movement. Hereinafter, the first modification example will be described in detail.

Figure 15:
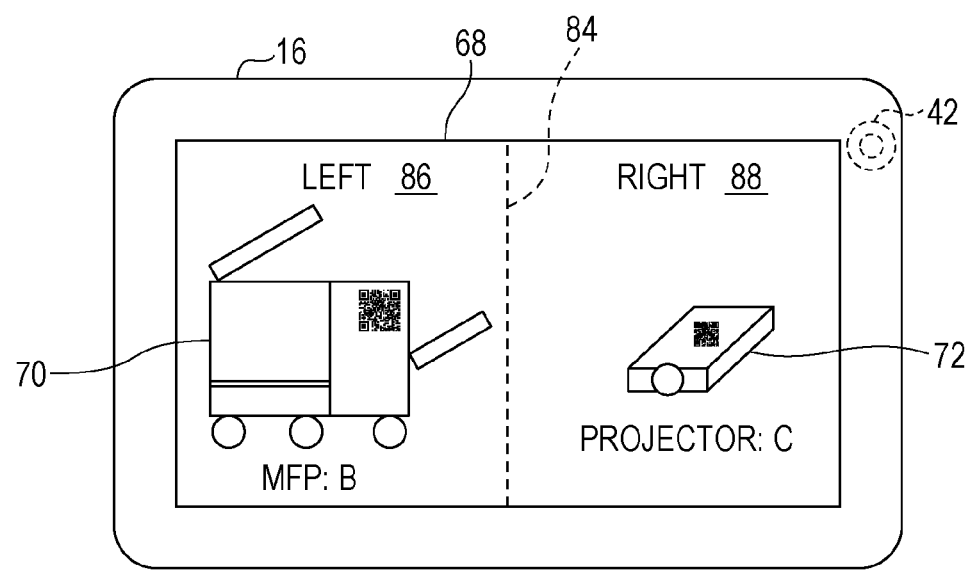
FIG. 15 is a diagram illustrating an example of a device display screen according to a first modification example.

FIG. 15 illustrates the device display screen 68 according to the first modification example. On the device display screen 68, for example, a starting-point display area 86 and a cooperation-partner display area 88 are set in advance, which are defined by a boundary line 84. A device image related to a device serving as a starting point is displayed in the starting-point display area 86. A device image related to a device serving as the next cooperation partner is displayed in the cooperation-partner display area 88. For example, the device display screen 68 is divided into a left area and a right area. The starting-point display area 86 is set in the left area, and the cooperation-partner display area 88 is set in the right area. Of course, the boundary line 84 and the character strings representing the display areas (for example, "left" and "right") are not necessarily displayed. In the example illustrated in FIG. 15, the device image 70 is displayed in the starting-point display area 86, and the device image 72 is displayed in the cooperation-partner display area 88. Thus, the image forming apparatus 10 (MFP (B)) related to the device image 70 is designated as a starting-point device, and the projector 12 (projector (C)) related to the device image 72 is designated as a cooperation-partner device. In this case, the controller 48 of the terminal apparatus 16 causes the UI unit 46 of the terminal apparatus 16 to display information about a cooperative function in which the image forming apparatus 10 is used as a starting-point device and the projector 12 is used as a cooperation-partner device. For example, the controller 48 of the terminal apparatus 16 causes the UI unit 46 of the terminal apparatus 16 to display information about a cooperative function that first uses the image forming apparatus 10 as a starting-point device and subsequently uses the projector 12 as a cooperation-partner device. In other words, the controller 48 of the terminal apparatus 16 causes the UI unit 46 of the terminal apparatus 16 to display information about a cooperative function of moving data from the image forming apparatus 10 as a starting-point device to the projector 12 as a cooperation-partner device. The device images 70 and 72 may be images generated through photography by a camera or schematic images (for example, icons).

Figure 16:
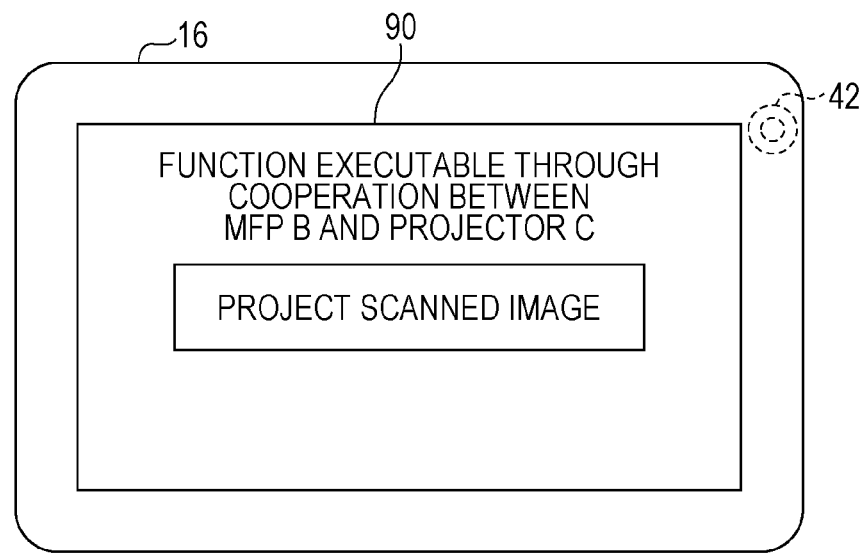
FIG. 16 is a diagram illustrating an example of a function display screen according to the first modification example.

FIG. 16 illustrates a display example of information about a cooperative function. A function display screen 90 is displayed on the UI unit 46 of the terminal apparatus 16. On the function display screen 90, information about a cooperative function that uses the image forming apparatus 10 as a starting-point device and the projector 12 as a cooperation-partner device is displayed. In the example illustrated in FIG. 16, the cooperative function is a function of moving image data obtained through scanning from the image forming apparatus 10 (MFP (B)) to the projector 12 (projector (C)) and projecting an image by the projector 12. Specifically, when the cooperative function is executed, the image forming apparatus 10 is used as a starting-point device, the image data generated through scanning by the image forming apparatus 10 is transmitted to the projector 12 as a cooperation-partner device, and the image is projected by the projector 12.

Figure 17:
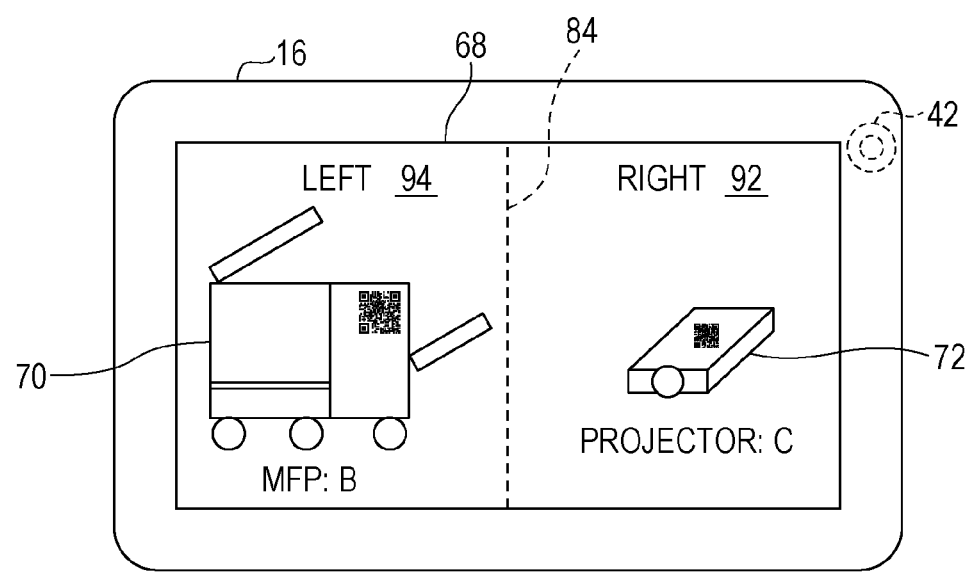
FIG. 17 is a diagram illustrating an example of a device display screen according to the first modification example.

FIG. 17 illustrates another example of the device display screen 68 according to the first modification example. On the device display screen 68, a starting-point display area 92 and a cooperation-partner display area 94 are set, which are defined by the boundary line 84. Unlike in the example illustrated in FIG. 15, the starting-point display area 92 is displayed on the right and the cooperation-partner display area 94 is displayed on the left on the device display screen 68. In this case, the projector 12 (projector (C)) related to the device image 72 is designated as a starting-point device and the image forming apparatus 10 (MFP (B)) related to the device image 70 is designated as a cooperation-partner device. In this case, the controller 48 of the terminal apparatus 16 causes the UI unit 46 of the terminal apparatus 16 to display information about a cooperative function that uses the projector 12 as a starting-point device and the image forming apparatus 10 as a cooperation-partner device. For example, the controller 48 of the terminal apparatus 16 causes the UI unit 46 of the terminal apparatus 16 to display information about a cooperative function that first uses the projector 12 as a starting-point device and subsequently uses the image forming apparatus 10 as a cooperation-partner device. In other words, the controller 48 of the terminal apparatus 16 causes the UI unit 46 of the terminal apparatus 16 to display information about a cooperative function of moving data from the projector 12 as a starting-point device to the image forming apparatus 10 as a cooperation-partner device.

Figure 18:
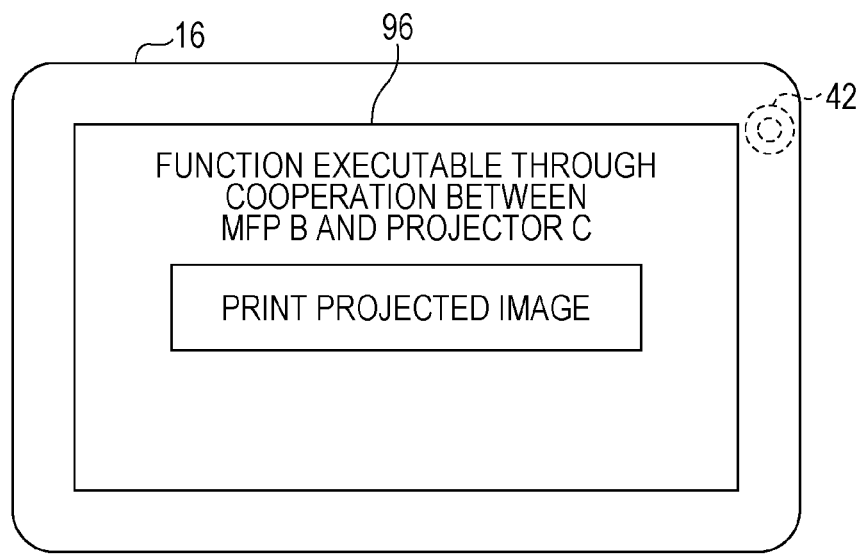
FIG. 18 is a diagram illustrating an example of a function display screen according to the first modification example.

FIG. 18 illustrates a display example of information about a cooperative function. A function display screen 96 is displayed on the UI unit 46 of the terminal apparatus 16. On the function display screen 96, information about a cooperative function that uses the projector 12 as a starting-point device and the image forming apparatus 10 as a cooperation-partner device is displayed. In the example illustrated in FIG. 18, the cooperative function is a function of printing a projected image. Specifically, when the cooperative function is executed, the projector 12 is used as a starting-point device, the image data projected by the projector 12 is transmitted to the image forming apparatus 10 as a cooperation-partner device, and the image data is printed by the image forming apparatus 10.

In the first modification example, the terminal apparatus 16 transmits the data of a device image displayed in the starting-point display area 86 (92), which is image data of a starting-point device, to the server 14, and transmits the data of a device image displayed in the cooperation-partner display area 88 (94), which is image data of a cooperation-partner device, to the server 14. The specifying unit 38 of the server 14 handles the device related to the image data of the starting-point device as a starting-point device, and handles the device related to the image data of the cooperation-partner device as a cooperation-partner device. The server 14 stores the data of a cooperative function management table according to the first modification example. In the cooperative function management table, device identification information of a starting-point device, device identification information of a cooperation-partner device, and cooperative function identification information are associated with each other. The specifying unit 38 of the server 14 specifies the cooperative function identification information associated with the device identification information of the device specified as a starting-point device and the device identification information of the device specified as a cooperation-partner device in the cooperative function management table. For example, the device identification information of the image forming apparatus 10 as a starting-point device, the device identification information of the projector 12 as a cooperation-partner device, and the cooperative function identification information of a cooperative function of projecting an image obtained through scanning (the cooperative function illustrated in FIG. 16) are associated with each other. Also, the device identification information of the projector 12 as a starting-point device, the device identification information of the image forming apparatus 10 as a cooperation-partner device, and the cooperative function identification information of a cooperative function of printing a projected image (the cooperative function illustrated in FIG. 18) are associated with each other. Thus, a cooperative function that uses functions of a starting-point device and a cooperation-partner device is specified by referring to the cooperative function management table according to the first modification example.

Figure 19:
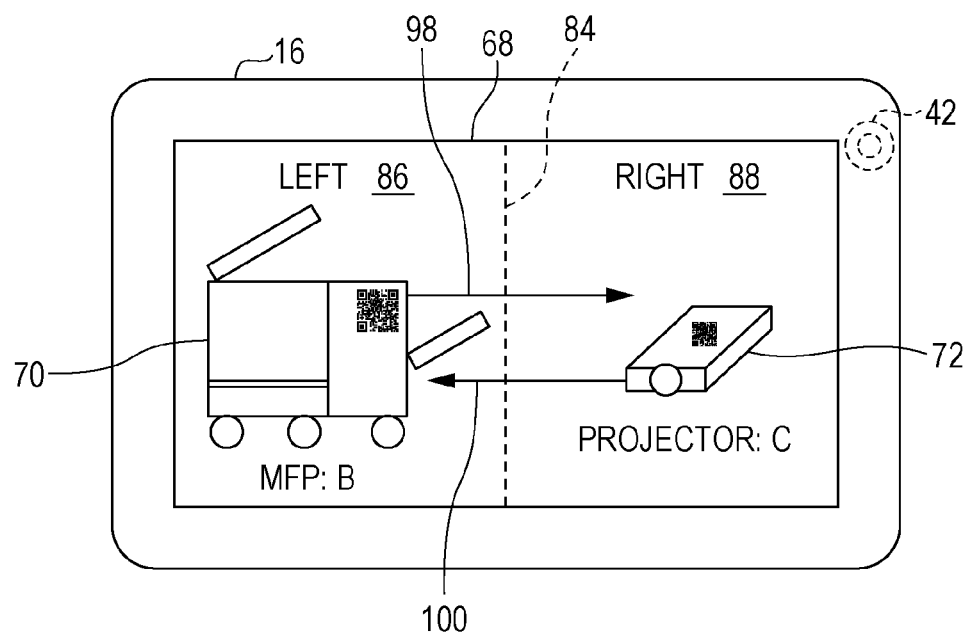
FIG. 19 is a diagram illustrating an example of a device display screen according to the first modification example.

In the first modification example, the display positions of device images may be changed. In this case, a device display screen on which device images are displayed functions as an edit screen for changing the display positions of the device images. The screen may be changed to the edit screen while photography is in progress, or the edit screen for providing an instruction of a cooperative function may be displayed in a state where device images are held after the device images have been captured or received. Of course, the screen may be changed to the edit screen by using another method. For example, as illustrated in FIG. 19, it is assumed that the device image 70 is displayed in the starting-point display area 86 and the device image 72 is displayed in the cooperation-partner display area 88. For example, if a user moves the device image 70 from the starting-point display area 86 to the cooperation-partner display area 88 in the direction indicated by an arrow 98, the controller 48 of the terminal apparatus 16 causes the device image 70 to be displayed in the cooperation-partner display area 88, not in the starting-point display area 86, in accordance with the movement instruction. Accordingly, the image forming apparatus 10 (MFP (B)) related to the device image 70 is specified (identified) as a cooperation-partner device. If the user moves the device image 72 from the cooperation-partner display area 88 to the starting-point display area 86 in the direction indicated by an arrow 100, the controller 48 of the terminal apparatus 16 causes the device image 72 to be displayed in the starting-point display area 86, not in the cooperation-partner display area 88, in accordance with the movement instruction. Accordingly, the projector 12 (projector (C)) related to the device image 72 is specified (identified) as a starting-point device. If the user provides an instruction to display a cooperative function after changing the display positions, information about a cooperative function corresponding to the changed display positions may be displayed on the UI unit 46 of the terminal apparatus 16. Even if the user does not provide an instruction to display a cooperative function, information about a cooperative function corresponding to the changed display positions may be displayed on the UI unit 46 of the terminal apparatus 16 in accordance with the change in the display positions.

In the above-described first modification example, the device display screen 68 is divided into the right and left areas. This is merely an example, and the device display screen 68 may be divided into upper and lower areas, so that a starting-point display area and a cooperation-partner display area may be displayed in the vertical direction. Alternatively, a starting-point display area may be displayed at or near the center of the screen, and a cooperation-partner display area may be displayed so as to surround the starting-point display area. Alternatively, a cooperation-partner display area may be displayed at or near the center of the screen, and a starting-point display area may be displayed so as to surround the cooperation-partner display area.

In the above-described first modification example, a description has been given of a cooperative function that uses two devices. Of course, the cooperative function may be a function that uses three or more devices. For example, the controller 48 of the terminal apparatus 16 causes plural cooperation-partner display areas to be displayed on the device display screen 68. An order of usage is set in advance to the individual cooperation-partner display areas, and the order in which the devices are used (the order of cooperation) is determined in accordance with the order or usage. For example, the device related to the device image displayed in a first cooperation-partner display area is used as a first cooperation-partner device, and the device related to the device image displayed in a second cooperation-partner display area is used as a second cooperation-partner device. The cooperative function in this case is a function in which the starting-point device is used first, then the first cooperation-partner device is used, and then the second cooperation-partner device is used. In other words, the cooperative function is a function of moving data from the starting-point device to the first cooperation-partner device and then to the second cooperation-partner device. The order of usage set in the individual cooperation-partner display areas may be changed by a user.

As described above, according to the first modification example, a cooperative function is changed in accordance with the display positions of device images, and thus the operability of changing a cooperative function may increase. Furthermore, a cooperative function may be changed with a simple operation.

Second Modification Example

Hereinafter, a second modification example will be described. In the second modification example, it is assumed that plural devices are identified, as in the first modification example. Furthermore, either information about a single-device function or information about a cooperative function is displayed in accordance with the display positions of device images.

Figure 20:
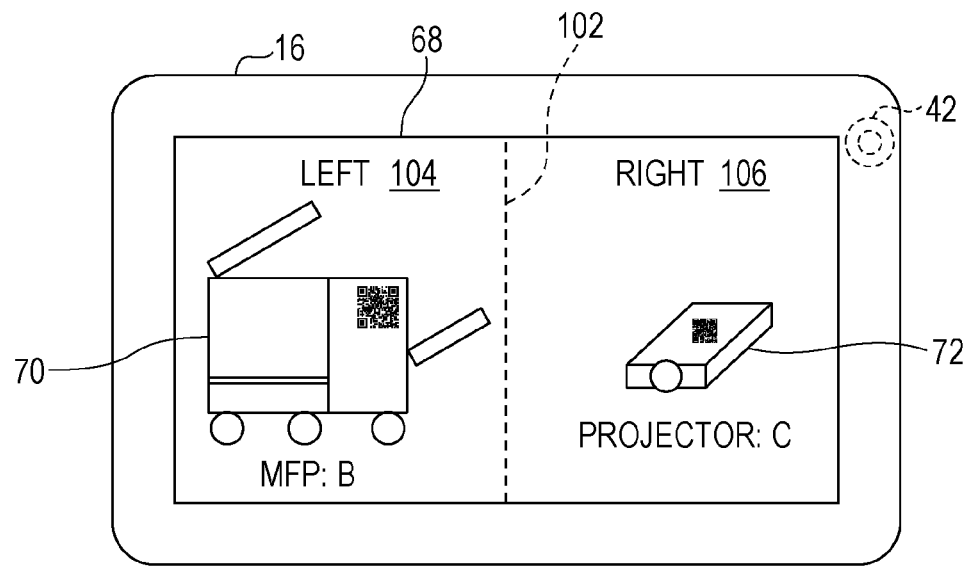
FIG. 20 is a diagram illustrating an example of a device display screen according to a second modification example.

For example, if plural device images are arranged in a specific direction (for example, in the horizontal direction) on a device display screen displayed on the UI unit 46 of the terminal apparatus 16, the controller 48 of the terminal apparatus 16 causes the UI unit 46 of the terminal apparatus 16 to display information about one or more cooperative functions that use functions of plural devices related to the plural device images. For example, as illustrated in FIG. 20, if the device display screen 68 is divided into a left area 104 and a right area 106 by a boundary line 102, if the device image 70 is displayed in the left area 104, and if the device image 72 is displayed in the right area 106, the controller 48 of the terminal apparatus 16 causes the UI unit 46 of the terminal apparatus 16 to display information about one or more cooperative functions that use the image forming apparatus 10 related to the device image 70 and the projector 12 related to the device image 72. As in the first modification example, one of the left area 104 and the right area 106 may be used as a starting-point display area and the other area may be used as a cooperation-partner display area.

Figure 21:
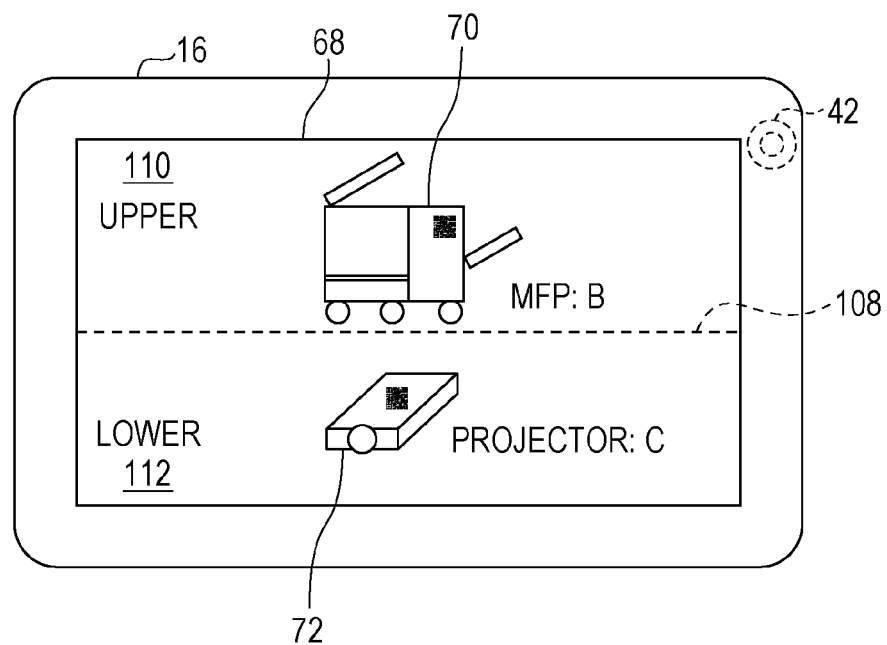
FIG. 21 is a diagram illustrating an example of a device display screen according to the second modification example.

If plural device images are arranged in a direction crossing the foregoing specific direction (for example, in the vertical direction) on the device display screen, the controller 48 of the terminal apparatus 16 causes the UI unit 46 of the terminal apparatus 16 to display information about functions (single-device functions) of individual devices related to the individual device images. For example, as illustrated in FIG. 21, if the device display screen 68 is divided into an upper area 110 and a lower area 112 by a boundary line 108, if the device image 70 is displayed in the upper area 110, and if the device image 72 is displayed in the lower area 112, the controller 48 of the terminal apparatus 16 causes the UI unit 46 of the terminal apparatus 16 to display information about one or more functions (single-device functions) of the image forming apparatus 10 related to the device image 70 and information about one or more functions (single-device functions) of the projector 12 related to the device image 72.

The boundary lines 102 and 108 and character strings "left", "right", "upper", and "lower" may or may not be displayed.

For example, if a user provides an instruction to display a display area for a cooperative function by using the UI unit 46 of the terminal apparatus 16, the controller 48 of the terminal apparatus 16 divides the device display screen 68 into the left area 104 and the right area 108, as illustrated in FIG. 20. On the other hand, if the user provides an instruction to display a display area for a single-device function, the controller 48 of the terminal apparatus 16 divides the device display screen 68 into the upper area 110 and the lower area 112, as illustrated in FIG. 21. Of course, even if an instruction to display a display area is not provided by the user, information about a cooperative function may be displayed if plural device images are arranged in the horizontal direction, and information about a single-device function may be displayed if plural device images are arranged in the vertical direction.

Information about a single-device function may be displayed if plural device images are arranged in the horizontal direction, and information about a cooperative function may be displayed if plural device images are arranged in the vertical direction. Of course, if plural device images are arranged in a direction other than the horizontal or vertical direction, either information about a single-device function or information about a cooperative function may be displayed in accordance with the direction.

As described above, according to the second modification example, information about a single-device function or information about a cooperative function is displayed in accordance with the display positions of plural device images, and accordingly these pieces of information are switched to each other and displayed with a simple operation.

Third Modification Example

Figure 22:
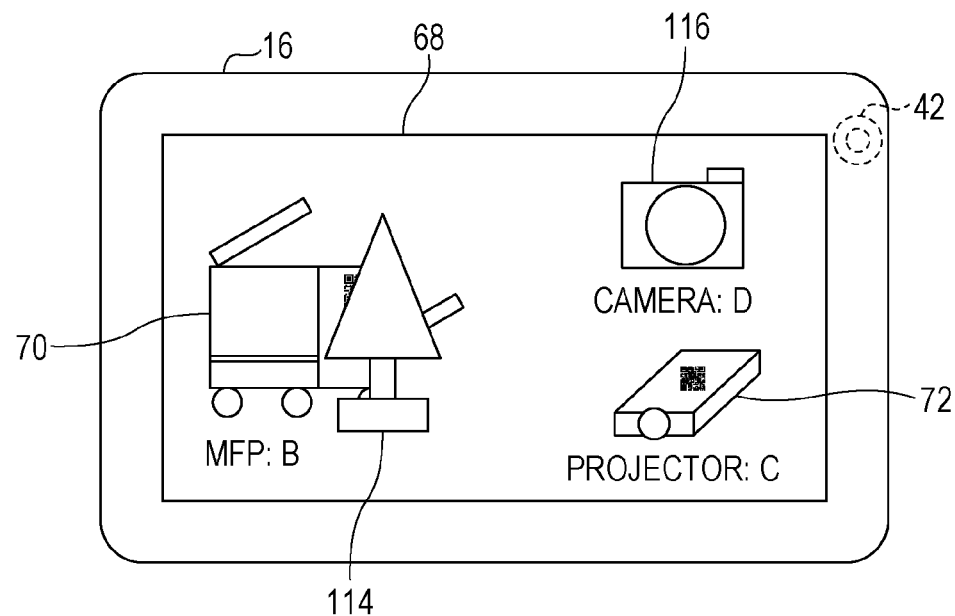
FIG. 22 is a diagram illustrating an example of a device display screen according to a third modification example.

Hereinafter, a third modification example will be described. In the third modification example, if a device image related to a photographed device does not satisfy a predetermined area standard, the device is not identified as a target device to be used. For example, it is assumed that the image forming apparatus 10, which is the MFP (B), is photographed by the camera 42, as illustrated in FIG. 22. A potted plant as an obstacle is located in front of the image forming apparatus 10 (between the image forming apparatus 10 and the terminal apparatus 16), and an image 114 of the potted plant is superimposed on the device image 70 (for example, an image generated through photography by the camera 42) related to the image forming apparatus 10. That is, the device image 70 has a missing portion behind the image of the obstacle. In this case, the image forming apparatus 10 is not identified as a target device to be used. For example, appearance image data obtained through photography performed on a device is transmitted from the terminal apparatus 16 to the server 14, and the specifying unit 38 of the server 14 specifies (identifies) the device on the basis of the appearance image data. In this case, if the appearance image data has a missing portion, the specifying unit 38 of the server 14 does not specify (identify) the device on the basis of the appearance image data. Accordingly, the device (image forming apparatus 10) related to the appearance image data including the missing portion is not identified as a target device to be used.

Here, the obstacle is something that is not identified as a device by the specifying unit 38 of the server 14. A potted plant or the like is not registered as a device. Thus, if appearance image data representing a potted plant is transmitted to the server 14, the potted plant is not identified as a device and is identified as an obstacle.

The specifying unit 38 of the server 14 may specify (identify) a device based on appearance image data in accordance with the size of the area other than a missing portion of the appearance image data. For example, if the size of the area other than a missing portion in appearance image data is larger than or equal to a predetermined threshold, the specifying unit 38 of the server 14 may specify (identify) a device on the basis of the area other than the missing portion in the appearance image data. For another example, if the area other than the missing portion is larger than the missing portion, the specifying unit 38 of the server 14 may specify (identify) the device on the basis of the area other than the missing portion in the appearance image data. For another example, if a device is able to be specified by applying the markerless AR technology to appearance image data, the specifying unit 38 of the server 14 may specify (identify) the device on the basis of the area other than a missing portion in the appearance image data even if the appearance image data includes the missing portion.

If the image forming apparatus 10 (MFP (B)) is not identified as a target device to be used, the controller 48 of the terminal apparatus 16 causes the UI unit 46 of the terminal apparatus 16 to display information about one or more functions of another device that has been photographed. For example, it is assumed that the projector 12, which is the projector (C), is photographed and the device image 72 related to the projector 12 is displayed, and that a camera (D) is photographed and a device image 116 related to the camera (D) is displayed. In this case, the controller 48 of the terminal apparatus 16 causes the UI unit 46 of the terminal apparatus 16 to display information about one or more cooperative functions that use functions of the projector (C) and the camera (D) or information about functions (single-device functions) of the projector (C) and the camera (D), in accordance with the process according to the above-described exemplary embodiment.

Alternatively, a cooperative function may be established by using a function related to an image portion other than a missing portion in appearance image data. For example, in the example illustrated in FIG. 22, if a body part of the MFP (B) (image forming apparatus 10) is represented by the device image 70, the controller 48 of the terminal apparatus 16 may cause the UI unit 46 of the terminal apparatus 16 to display information about one or more cooperative functions that use a function of the body part or information about one or more functions (single-device functions) of the body part in accordance with the process according to the above-described exemplary embodiment. For example, for each part of a device, an appearance part image representing the part and a function of the part are associated with each other, and the device function information 32 representing the correspondence is stored in the memory 30 of the server 14. A function related to an image portion other than a missing portion is specified (identified) by referring to the device function information 32. Furthermore, the cooperative function information 34 representing one or more cooperative functions that use functions plural parts is stored in the memory 30 of the server 14. Of course, the cooperative function information 34 may include information representing one or more cooperative functions that use a function of a part of a device and a function of the whole device. One or more cooperative functions that use a function related to an image portion other than a missing portion are specified (identified) by referring to the cooperative function information 34.

If a device image has a missing portion, the specifying unit 38 of the server 14 may specify (identify) a device related to the device image by using plural identification technologies such as the marker-based AR technology and position information AR technology, and thereby may specify (identify) one or more functions of the device and one or more cooperative functions that use a function of the device.

As described above, according to the third modification example, a device related to a device image having a missing portion is excluded from a target device to be used. Accordingly, a situation is prevented from occurring where a device unintended by a user is identified in a case where a device related to a device image having a missing portion is not desired by the user as a target device to be used. As a result, display of information about one or more functions of the device or information about one or more cooperative functions that use a function of the device is prevented.

Fourth Modification Example

Hereinafter, a fourth modification example will be described. In the fourth modification example, it is assumed that plural devices are identified as in the first modification example. Furthermore, a device that is used as a starting point of a cooperative function is changed in accordance with a positional relationship between a photographing apparatus that photographs a device and individual devices.

For example, a device (photographed device) nearer to the photographing apparatus (for example, the terminal apparatus 16 including the camera 42) is given a higher priority in being used as a device at a starting point of a cooperative function. In this case, the specifying unit 38 of the server 14 obtains information representing the distances between the terminal apparatus 16 and individual devices, and determines an order of priority of the devices on the basis of the distances. The position information of the terminal apparatus 16 and the individual devices is obtained by using, for example, a Global Positioning System (GPS) function. Of course, the position information may be obtained by using another technology. For example, the terminal apparatus 16 and the individual devices have a GPS function and obtain position information representing their positions. The terminal apparatus 16 obtains position information from the individual devices and transmits the position information of the terminal apparatus 16 and the individual devices to the server 14. The specifying unit 38 of the server 14 calculates the distances between the terminal apparatus 16 and the individual devices on the basis of the position information of the terminal apparatus 16 and the individual devices. For example, a device that is nearest to the terminal apparatus 16 is used as a top-priority device, and a device that is second nearest to the terminal apparatus 16 is used as a second-priority device. In this case, the specifying unit 38 of the server 14 specifies (identifies) a cooperative function that uses functions in order from a function of the top-priority device, and the controller 48 of the terminal apparatus 16 causes the UI unit 46 of the terminal apparatus 16 to preferentially display the cooperative function that uses functions in order from a function of the top-priority device.

Figure 23:
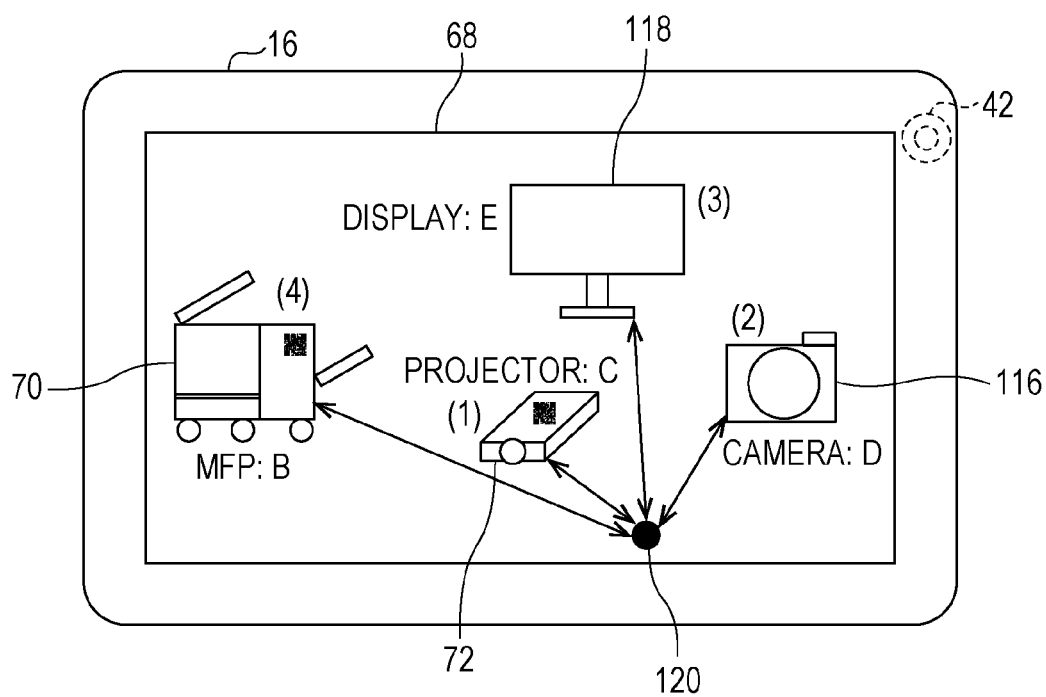
FIG. 23 is a diagram illustrating an example of a device display screen according to a fourth modification example.

For example, as illustrated in FIG. 23, it is assumed that the image forming apparatus 10 as the MFP (B), the projector 12 as the projector (C), the camera (D), and a display (E) are photographed by the camera 42. In this case, the device image 70 related to the MFP (B), the device image 72 related to the projector (C), the device image 116 related to the camera (D), and a device image 118 related to the display (E) are displayed on the UI unit 46 of the terminal apparatus 16. For example, if it is determined that the distance to the terminal apparatus 16 increases in the order of the projector (C), the camera (D), the display (E), and the MFP (B), a cooperative function that uses the projector (C), the camera (D), the display (E), and the MFP (B) in this order is specified (identified), and the cooperative function is preferentially displayed on the UI unit 46 of the terminal apparatus 16.

For another example, a device related to a device image displayed nearer to a reference position 120 set on the device display screen 68 may be given a higher priority in being used as a device at a starting point of a cooperative function. In this case, the terminal apparatus 16 transmits information representing the distances between the reference position 120 and individual device images (for example, the lengths of individual arrows illustrated in FIG. 23) to the server 14. The specifying unit 38 of the server 14 assigns an order of priority to the individual devices related to the individual device images on the basis of the distances between the reference position 120 and the individual device images. For example, a device related to a device image that is nearest to the reference position 120 is used as a top-priority device, and a device related to a device image that is second nearest to the reference position 120 is used as a second-priority device. In this case, the specifying unit 38 of the server 14 specifies (identifies) a cooperative function that uses functions in order from a function of the top-priority device, and the controller 48 of the terminal apparatus 16 causes the UI unit 46 of the terminal apparatus 16 to display the cooperative function. The controller 48 of the terminal apparatus 16 may or may not display a mark representing the reference position 120 (for example, a circle mark) and an arrow representing the distance between images on the device display screen 68.

The controller 48 of the terminal apparatus 16 may cause information representing an order of priority (for example, numbers corresponding to the distances from the terminal apparatus 16) to be displayed on the device display screen 68 in association with individual device images. For example, information representing an order of priority (for example, numbers) is displayed near the individual device images. In the example illustrated in FIG. 23, the number representing the top priority is displayed near the device image 72 related to the projector (C). The same applies to the other device images.

As described above, according to the fourth modification example, a cooperative function that preferentially uses a function of a device nearer to the photographing apparatus (for example, the terminal apparatus 16) is preferentially displayed. Accordingly, if a user wants to use devices in order from a device nearest to the photographing apparatus (for example, the terminal apparatus 16), information about a cooperative function suitable for the user's desire is displayed, which may be convenient.

Figure 24:
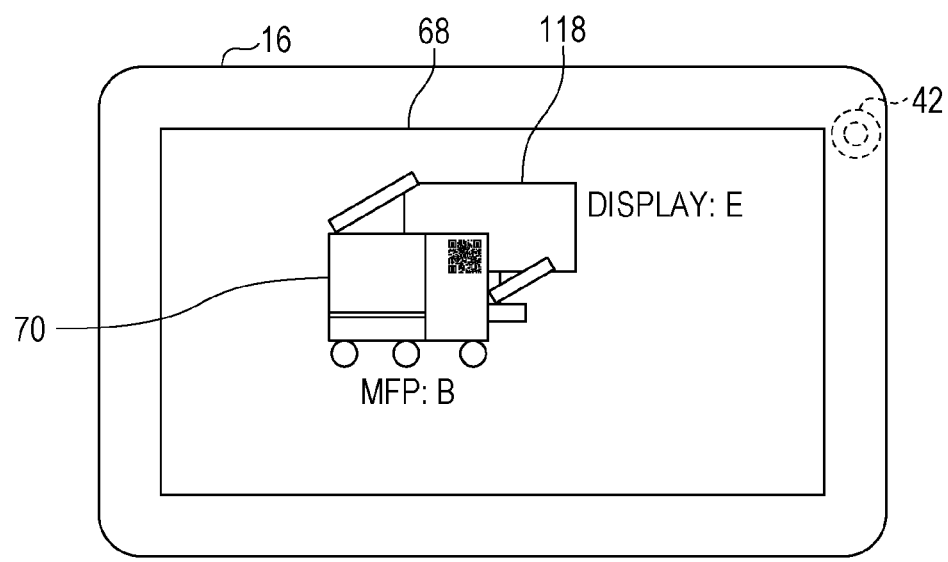
FIG. 24 is a diagram illustrating an example of a device display screen according to the fourth modification example.

The positional relationship between individual devices may be determined on the basis of a relationship in a missing portion between device images (appearance images) related to the individual devices. For example, if the device image 70 related to the MFP (B) is superimposed on the device image 118 (for example, an appearance image obtained through photography by the camera 42) related to the display (E), as illustrated in FIG. 24, it is determined that the MFP (B) is nearer to the terminal apparatus 16 than the display (E) is. The determination may be performed by the terminal apparatus 16 or the server 14. In this case, the specifying unit 38 of the server 14 specifies (identifies) a cooperative function that uses the MFP (B) and the display (E) in this order, and the controller 48 of the terminal apparatus 16 causes the UI unit 46 of the terminal apparatus 16 to preferentially display information about the cooperative function.

Since the device image 70 is superimposed on the device image 118, the device image 118 has a missing portion. In this case, the specifying unit 38 of the server 14 may specify (identify) the display (E) related to the device image 118 by using plural identification technologies such as the marker-based AR technology and the position information AR technology, and thereby may specify (identify) one or more functions of the display (E) and one or more cooperative functions that use a function of the display (E).

Fifth Modification Example

Hereinafter, a fifth modification example will be described. In the fifth modification example, a function is assigned to each part of a device, and information about a function assigned to an identified (for example, photographed) part or information about a cooperative function that uses a function assigned to an identified (for example, photographed) part is displayed. Hereinafter, the fifth modification example will be described in detail.

FIG. 25 illustrates an example of a device function management table according to the fifth modification example. The data of the device function management table according to the fifth modification example is stored as the device function information 32 in the server 14. In the device function management table according to the fifth modification example, for example, a device ID, information representing the name of a device (for example, the type of a device), information representing the name of a part of a device (for example, the type of a part), a part ID as part identification information for identifying the part, information representing a function assigned to the part (a function of the part), and a part image ID for identifying a device part image related to the part are associated with each other. A device part image is an image representing an appearance of a part of a device obtained through photography by a camera. Of course, a part image schematically representing a part of a device may be associated with the part. For example, different functions are assigned to individual parts of a device.

Specifically, a screen display function is assigned to a display part of the PC (A), and information representing the screen display function is associated with a part image ID of a device part image related to the display part. The screen display function is a function of displaying information on the PC (A). A data storage function is assigned to a body part of the PC (A), and information representing the data storage function is associated with a part image ID of a device part image related to the body part. The data storage function is a function of storing data in the PC (A).

A print function is assigned to a body part of the MFP (B), and information representing the print function is associated with a part image ID of a device part image related to the body part. A scan function is assigned to a reading part of the MFP (B) (for example, a part corresponding to a document cover, a document glass, and an automatic document feeder of the MFP (B)), and information representing the scan function is associated with a part image ID of a device part image related to the reading part. A stapling function is assigned to a post-processing apparatus of the MFP (B), and information representing the stapling function is associated with a part image ID of a device part image related to the post-processing apparatus. The stapling function is a function of stapling output sheets.

A function assigned to a part of a device is specified (identified) by using, for example, the markerless AR technology. For example, if a part of a device is photographed by a camera (for example, the camera 42 of the terminal apparatus 16), appearance image data representing the part is transmitted from the terminal apparatus 16 to the server 14. The specifying unit 38 of the server 14 specifies (identifies) a function associated with the appearance image data in the device function management table. Accordingly, the function assigned to the photographed part is specified (identified). For example, if the body part of the MFP (B) is photographed by the camera 42, the appearance image data representing the body part of the MFP (B) is transmitted from the terminal apparatus 16 to the server 14. The specifying unit 38 of the server 14 specifies the print function associated with the appearance image data in the device function management table. Accordingly, it is specified that the function assigned to the body part of the MFP (B) is the print function.

Of course, a function assigned to a part of a device may be specified (identified) by using the marker-based AR technology. For example, each part of a device is provided with a marker, such as a two-dimensional barcode obtained by coding part identification information (for example, part ID) for identifying the part. If the marker on the part is photographed by a camera and the marker-based technology is applied thereto, the part identification information (for example, the part ID) of the part is obtained. The application of the marker-based AR technology may be performed by the terminal apparatus 16 or the server 14. After the part identification information is obtained in this way, the specifying unit 38 of the server 14 specifies (identifies) a function associated with the part identification information (for example, the part ID) in the device function management table.

FIG. 26 illustrates an example of a cooperative function management table according to the fifth modification example. The data of the cooperative function management table according to the fifth modification example is stored, as the cooperative function information 34, in the server 14. The cooperative function management table according to the fifth modification example is information representing cooperative functions, each using functions of plural parts. In the cooperative function management table, for example, information representing a combination of parts of devices, information representing a combination of part IDs, and information representing a cooperative function that uses functions of plural parts included in the combination are associated with each other. Of course, in the cooperative function management table, information representing a combination of a part of a device and a whole device, and information representing a cooperative function that uses a function of the part of the device and a function of the whole device may be associated with each other.

Specifically, a print function as a cooperative function is assigned with a combination of the display part of the PC (A) and the body part of the MFP (B), and information representing the print function as a cooperative function is associated with information representing a combination of the part ID of the display part of the PC (A) and the part ID of the body part of the MFP (B). The print function as a cooperative function is, for example, a function of transmitting data stored in the PC (A) to the MFP (B) and printing the data by the MFP (B).

A print function as a cooperative function is assigned to a combination of the body part of the MFP (B) and the body part of the projector (C), and information representing the print function as a cooperative function is associated with information representing a combination of the part ID of the body part of the MFP (B) and the part ID of the body part of the projector (C). The print function as a cooperative function is, for example, a function of transmitting data projected by the projector (C) to the MFP (B) and printing the data by the MFP (B).

A scan and projection function as a cooperative function is assigned to a combination of the reading part of the MFP (B) and the body part of the projector (C), and information representing the scan and projection function as a cooperative function is associated with information representing a combination of the part ID of the reading part of the MFP (B) and the part ID of the body part of the projector (C). The scan and projection function as a cooperative function is, for example, a function of transmitting data generated through scanning by the MFP (B) to the projector (C) and projecting the data by the projector (C).

The cooperative function may be a function that uses functions of plural parts included in the same device, or may be a function that uses functions of parts included in plural different devices. The cooperative function may be a function that uses functions of three or more parts.

For example, after plural parts of a device (for example, plural parts of plural different devices or plural parts of the same device) are specified (identified) by using the marker-based AR technology or the markerless AR technology, the specifying unit 38 of the server 14 specifies (identifies) a cooperative function associated with a combination of the identified plural parts in the cooperative function management table. Accordingly, a cooperative function that uses the functions of the plural identified (for example, photographed) parts is specified (identified). For example, if the body part of the MFP (B) and the body part of the projector (C) are photographed by the camera 42 of the terminal apparatus 16 and if the body part of the MFP (B) and the body part of the projector (C) are identified, the specifying unit 38 of the server 14 specifies a print function and so forth as a cooperative function associated with a combination of the body part of the MFP (B) and the body part of the projector (C) in the cooperative function management table.

In the fifth modification example, as in the above-described exemplary embodiment, information about one or more single-device functions or information about one or more cooperative functions may be displayed on the UI unit 46 of the terminal apparatus 16. For example, if an instruction to display a single-device function is provided by a user or if only one part of a device is identified, the controller 48 of the terminal apparatus 16 may cause the UI unit 46 of the terminal apparatus 16 to display information about a function of the identified one part. On the other hand, if plural parts of plural devices are identified, if plural parts of the same device are identified, or if an instruction to display a cooperative function is provided after plural parts are identified, the controller 48 of the terminal apparatus 16 may cause the UI unit 46 of the terminal apparatus 16 to display information about a cooperative function that uses functions of the plural identified parts.

Figure 27:
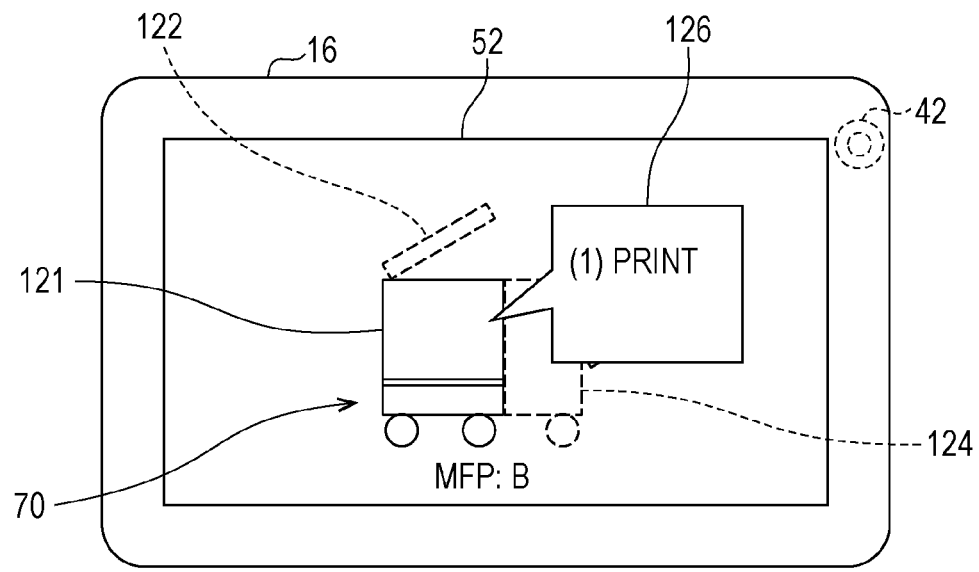
FIG. 27 is a diagram illustrating an example of a device display screen according to the fifth modification example.

Hereinafter, the fifth modification example will be described by using a specific example. For example, it is assumed that the body part of the MFP (B) as the image forming apparatus 10 is photographed by the camera 42 of the terminal apparatus 16 and that the body part of the MFP (B) is specified (identified) by using the marker-based AR technology or the markerless AR technology. In this case, as illustrated in FIG. 27, for example, the device display screen 52 is displayed on the UI unit 46 of the terminal apparatus 16, and a device part image 121 related to the body part of the MFP (B) is displayed on the device display screen 52. If the reading part and the post-processing apparatus of the MFP (B) are not identified, a device part image 122 related to the reading part and a device part image 124 related to the post-processing apparatus are not displayed on the device display screen 52.

For example, if an instruction to display a single-device function is provided by a user or if only one part, not plural parts, is photographed, the controller 48 of the terminal apparatus 16 causes the UI unit 46 of the terminal apparatus 16 to display information about a function of the body part of the MFP (B) as information about a single-device function. The process of identifying a function of the body part of the MFP (B) may be performed by the terminal apparatus 16 or the server 14. In the example illustrated in FIG. 27, information about a function of the body part of the MFP (B) (for example, the name of the function) is displayed in a display area 126 on the device display screen 52. If the information about the function displayed in the display area 126 is designated by a user and if an instruction to execute the function is provided, the designated function is executed. The display area 126 is located near the device part image 121 related to the body part of the MFP (B). Of course, the controller 48 of the terminal apparatus 16 may cause the UI unit 46 of the terminal apparatus 16 to display a function display screen different from the device display screen 52 and to display information about a function of the body part of the MFP (B) in the function display screen.

If a device image representing a whole device is displayed on the UI unit 46 of the terminal apparatus 16, information about a function corresponding to a part designated by a user in the device image may be displayed, as information about a single-device function, on the UI unit 46 of the terminal apparatus 16. For example, different functions are assigned to individual positions of a device image, and information about the individual functions corresponding to the individual positions is stored, as the device function information 32, in the server 14. The information representing a position designated by the user in the device image is transmitted from the terminal apparatus 16 to the server 14, and the specifying unit 38 of the server 14 specifies (identifies) a function corresponding to the designated position. The information about the function is displayed, as a single-device function, on the UI unit 46 of the terminal apparatus 16. For another example, a device image representing a whole device may be formed of plural device part images representing plural parts constituting the device. As described above, since a function is assigned to a device part image, the function corresponding to the device part image designated by the user is specified and information about the function is displayed on the UI unit 46 of the terminal apparatus 16.

If a whole device is photographed, the controller 48 of the terminal apparatus 16 may cause the UI unit 46 of the terminal apparatus 16 to display information about one or plural functions of the device. If a part of a device is photographed, the controller 48 of the terminal apparatus 16 may cause the UI unit 46 of the terminal apparatus 16 to display information about a function assigned to the part. For example, if the whole MFP (B) is photographed, information about the functions of the MFP (B) may be displayed as illustrated in FIG. 9. If the body part of the MFP (B) is photographed, information about the function of the body part may be displayed as illustrated in FIG. 27.

Figure 28:
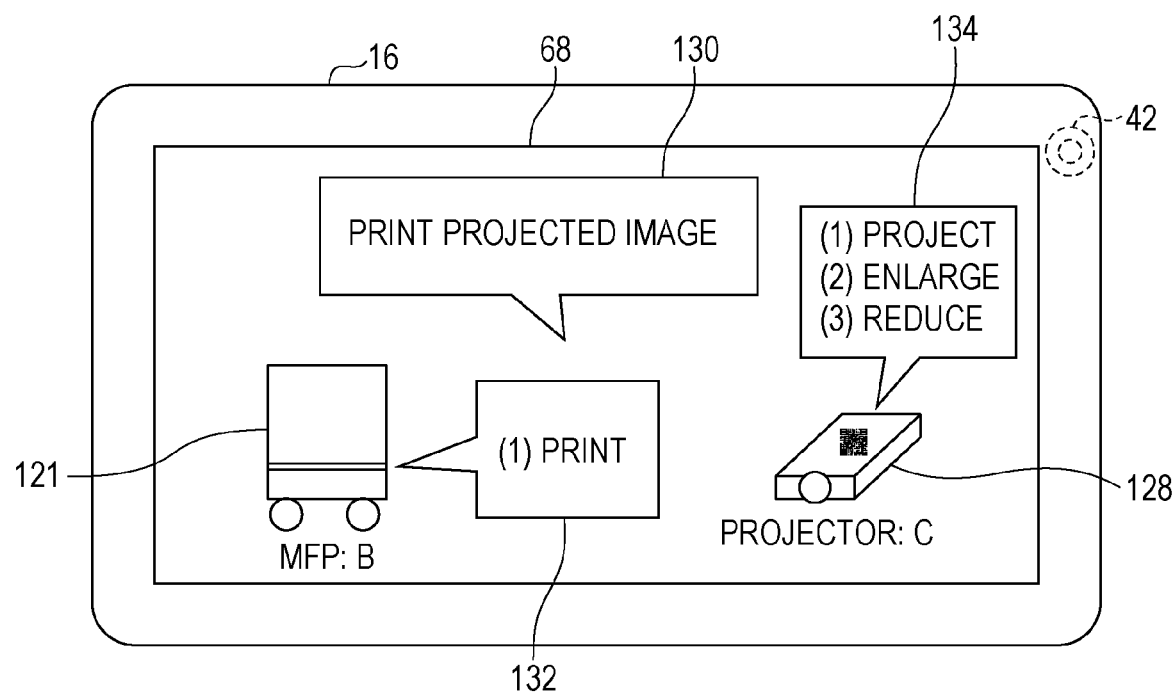
FIG. 28 is a diagram illustrating an example of a device display screen according to the fifth modification example.

It is assumed that the body part of the MFP (B) as the image forming apparatus 10 and the body part of the projector (C) as the projector 12 are photographed by the camera 42 of the terminal apparatus 16, and that the body part of the MFP (B) and the body part of the projector (C) are specified (identified) by using the marker-based AR technology or the markerless AR technology. In this case, as illustrated in FIG. 28, for example, the device display screen 68 is displayed on the UI unit 46 of the terminal apparatus 16, and the device part image 121 related to the body part of the MFP (B) and a device part image 128 related to the body part of the projector (C) are displayed on the device display screen 68.

If an instruction to display a cooperative function is provided by a user, if plural parts are photographed within a photography period, or if plural parts are photographed before an instruction to execute a function assigned to one part is provided, the controller 48 of the terminal apparatus 16 causes the UI unit 46 of the terminal apparatus 16 to display information about a cooperative function that uses a function of the body part of the MFP (B) and a function of the body part of the projector (C). The process of identifying a cooperative function may be performed by the terminal apparatus 16 or the server 14. In the example illustrated in FIG. 28, information about a cooperative function (for example, the name of the cooperative function) is displayed in a display area 130 on the device display screen 68. If the information about the function displayed in the display area 130 is designated by a user and if an instruction to execute the cooperative function is provided, the designated cooperative function is executed. Also, in the example illustrated in FIG. 28, information about a function of the body part of the MFP (B) is displayed in a display area 132, and information about functions of the body part of the projector (C) is displayed in a display area 134. The display area 132 is located near the device part image 121 related to the body part of the MFP (B), and the display area 134 is located near the device part image 128 related to the body part of the projector (C). Of course, the controller 48 of the terminal apparatus 16 may cause the UI unit 46 of the terminal apparatus 16 to display a function display screen different from the device display screen 68, and to display information about a cooperative function or information about a single-device function in the device display screen. Alternatively, the display areas 132 and 134 are not necessarily displayed, and display/non-display may be switched in accordance with an instruction from a user.

The controller 48 of the terminal apparatus 16 may cause the name of a function of a device related to a device part image (for example, print, scan, or the like) to be displayed on the device display screen 68. Accordingly, a user is provided with information clearly representing the function assigned to each part. Of course, the name of a function is not necessarily displayed.

As described above, according to the fifth modification example, if a part of a device is identified, information about a function of the part is displayed, and if plural parts are identified, information about a cooperative function that uses functions of the plural parts is displayed. For example, as a result of identifying (for example, photographing) a target part to be used in a device, information about a function of the part is displayed. Thus, information that is not necessary to the user is unlikely to be displayed, which may be convenient compared to a case where information about all functions of a device is displayed. Also, as a result of identifying (for example, photographing) plural parts, information about a cooperative function that uses functions of the plural parts is displayed. Thus, information that is not necessary to the user is unlikely to be displayed, which may be convenient.

Sixth Modification Example

Figure 29:
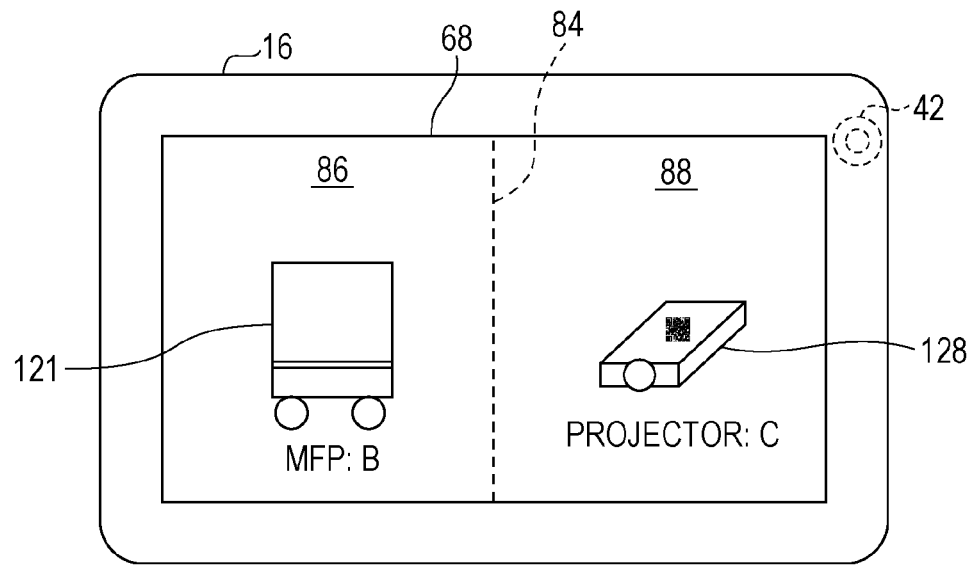
FIG. 29 is a diagram illustrating an example of a device display screen according to a sixth modification example.

Hereinafter, a sixth modification example will be described. The sixth modification example is a combination of the first and fifth modification examples. For example, it is assumed that the body part of the MFP (B) and the body part of the projector (C) are photographed. In this case, as illustrated in FIG. 29, for example, the device display screen 68 is displayed on the UI unit 46 of the terminal apparatus 16, and the device part image 121 related to the body part of the MFP (B) and the device part image 128 related to the body part of the projector (C) are displayed on the device display screen 68. As in the first modification example, the starting-point display area 86 and the cooperation-partner display area 88 are set on the device display screen 68. In this case, the part of the device related to the device part image displayed in the starting-point display area 86 is designated as a starting point, and the part of the device related to the device part image displayed in the cooperation-partner display area 88 is designated as a cooperation partner. In the example illustrated in FIG. 29, the device part image 121 is displayed in the starting-point display area 86 and thus the body part of the MFP (B) is designated as a starting point. Also, the device part image 128 is displayed in the cooperation-partner display area 88 and thus the body part of the projector (C) is designated as a cooperation partner. In this case, the controller 48 of the terminal apparatus 16 causes the UI unit 46 of the terminal apparatus 16 to display information about a cooperative function that uses the body part of the MFP (B) as a starting point and that uses the body part of the projector (C) as a cooperation partner. For example, the controller 48 of the terminal apparatus 16 causes the UI unit 46 of the terminal apparatus 16 to display information about a cooperative function that first uses the body part of the MFP (B) as a starting point and subsequently uses the body part of the projector (C) as a cooperation partner. In other words, the controller 48 of the terminal apparatus 16 causes the UI unit 46 of the terminal apparatus 16 to display information about a cooperative function of moving data from the body part of the MFP (B) as a starting point to the projector (C) as a cooperation partner.

Alternatively, the display position of a device part image may be changed as in the first modification example. For example, if a user moves the device part image 121 to the cooperation-partner display area 88, the body part of the MFP (B) related to the device part image 121 is handled as a part of a device as a cooperation partner. Likewise, if the user moves the device part image 128 to the starting-point display area 86, the body part of the projector (C) related to the device part image 128 is handled as a part of a device as a starting point.

As in the first modification example, the terminal apparatus 16 transmits, to the server 14, the data of the device part image displayed in the starting-point display area 86 as the image data of a part of a starting-point device, and the data of the device part image displayed in the cooperation-partner display area 88 as the image data of a part of a cooperation-partner device. The specifying unit 38 of the server 14 sets the part of the device related to the image data of the part of the starting-point device as a starting point, and sets the part of the device related to the image data of the part of the cooperation-partner device as a cooperation partner. The server 14 stores the data of a cooperative function management table according to the sixth modification example. In the cooperative function management table, identification information of a part of a starting-point device, identification information of a part of a cooperation-partner device, and cooperative function identification information are associated with each other. The specifying unit 38 of the server 14 specifies cooperative function identification information associated with identification information of a part of a starting-point device and identification information of a part of a cooperation-partner device in the cooperative function management table. After the cooperative function identification information is specified in this manner, information about the specified cooperative function is displayed on the UI unit 46 of the terminal apparatus 16.

Figure 30:
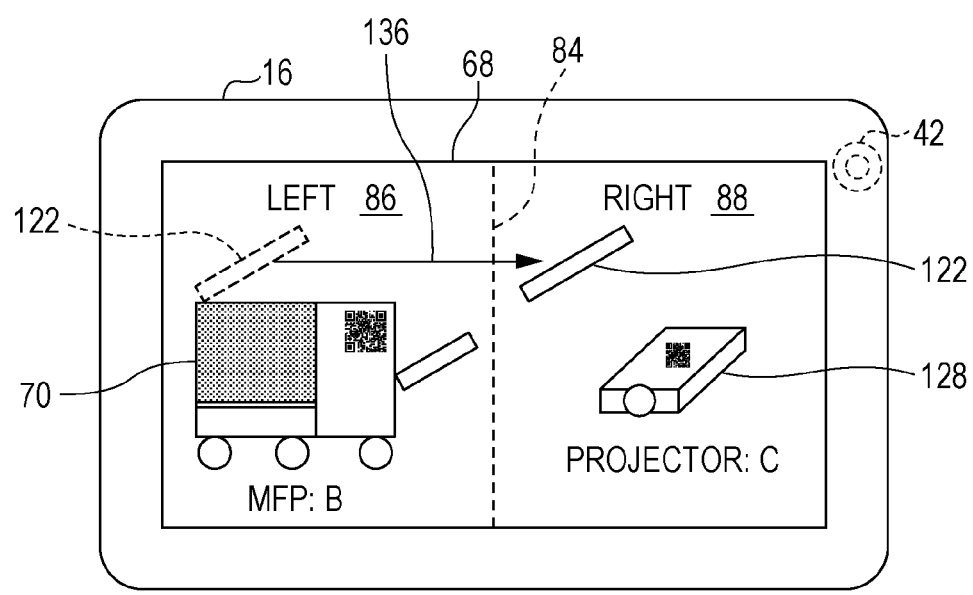
FIG. 30 is a diagram illustrating an example of a device display screen according to the sixth modification example.

Alternatively, a device part image representing a part may be separated from a device image representing a whole device, and the display position of the device part image may be changed. For example, as illustrated in FIG. 30, it is assumed that the device image 70 representing the whole MFP (B) is displayed in the starting-point display area 86. In this case, if a user moves the device part image 122 included in the device image 70 from the starting-point display area 86 to the cooperation-partner display area 88 as indicated by an arrow 136, a function of the part related to the device part image 122 (for example, a scan function of the reading part) is set as a function as a cooperation partner. Likewise, if the user moves a device part image included in the device image displayed in the cooperation-partner display area 88 to the starting-point display area 86, a function of the part related to the device part image is set as a function as a starting point.

As described above, according to the sixth modification example, a cooperative function is changed in accordance with the display position of a device part image, and thus the operability of changing a cooperative function may increase. Furthermore, a cooperative function may be changed with a simple operation.

Seventh Modification Example

Figure 31:
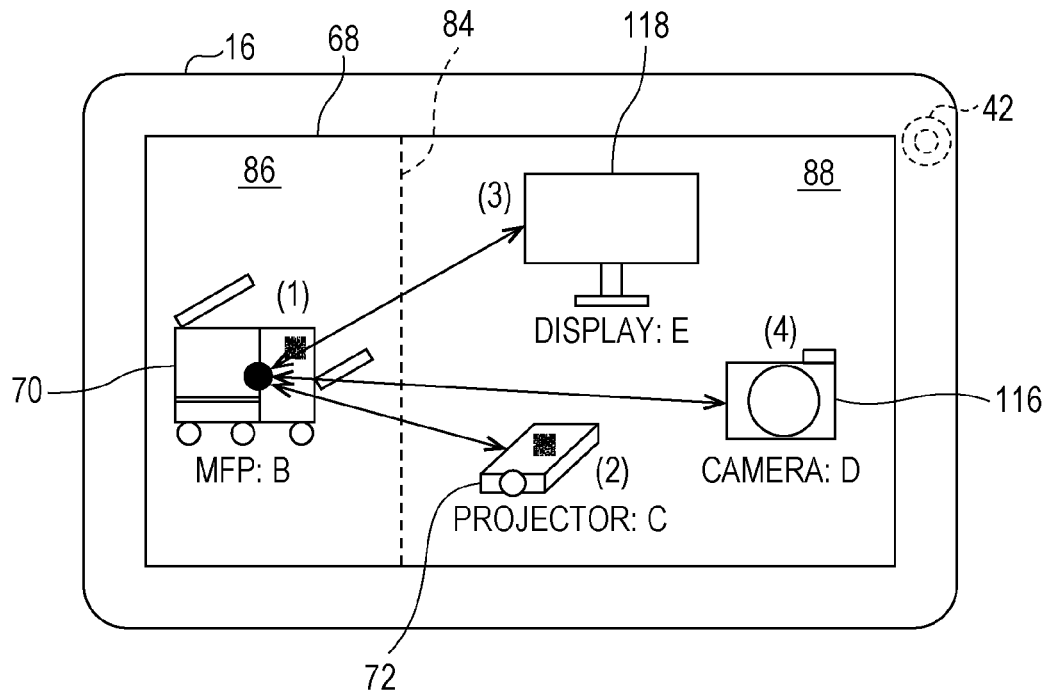
FIG. 31 is a diagram illustrating an example of a device display screen according to a seventh modification example.
Figure 32:
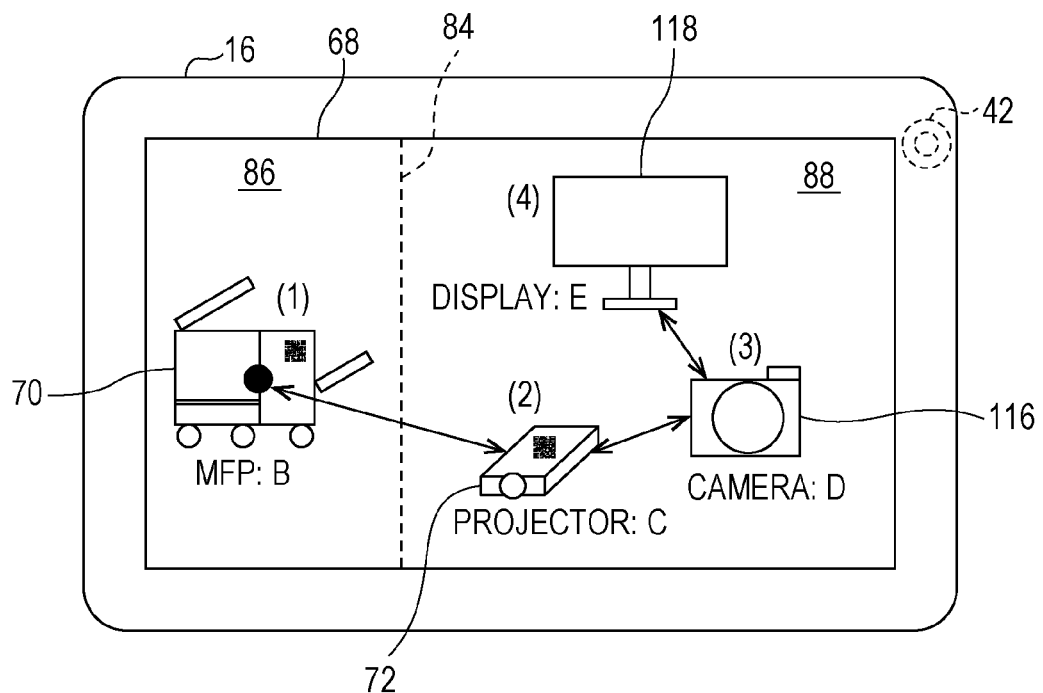
FIG. 32 is a diagram illustrating an example of a device display screen according to the seventh modification example.

Hereinafter, a seventh modification example will be described with reference to FIGS. 31 and 32. FIGS. 31 and 32 illustrate the device display screen 68 according to the seventh modification example. In the seventh modification example, as in the above-described first modification example and so forth, the starting-point display area 86 and the cooperation-partner display area 88 are set on the device display screen 68, and plural device images (for example, device images 72, 116, and 118) are displayed in the same cooperation-partner display area 88. The device image 70 is displayed in the starting-point display area 86. In this case, the order of usage (the order of cooperation) of individual devices related to the individual device images displayed in the cooperation-partner display area 88 may be designated by a user or may be automatically set on the basis of the positional relationship among the device images.

In the case of setting an order of cooperation in response to an instruction from a user, the user sequentially designates the individual device images displayed in the cooperation-partner display area 88. For example, if the individual device images are designated by the user in the order of the device image 72 related to the projector (C), the device image 118 related to the display (E), and the device image 116 related to the camera (D), the devices as cooperation partners cooperate (are used) in the designation order after the MFP (B) related to the device image 70 displayed in the starting-point display area 86 is used first.

In the case of automatically setting the order of cooperation, the order may be set so that the device related to the device image nearest to the device image 70 displayed in the starting-point display area 86 is used first. In the example illustrated in FIG. 31, the device image 72 is nearest to the device image 70, the device image 118 is second nearest thereto, and the device image 116 is third nearest thereto in the cooperation-partner display area 88. In this case, the MFP (B) is used first, and then the projector (C), the display (E), and the camera (D) are used in this order.

For another example, the device related to the device image displayed at a position nearest to the device image 70 displayed in the starting-point display area 86 may be set as the device as the first cooperation partner, and the order of cooperation of the other devices as cooperation partners may be determined on the basis of the positional relationship among the device images displayed in the cooperation-partner display area 88. For example, as illustrated in FIG. 32, the device related to the device image 72 displayed at a position nearest to the device image 70 is set as the device as the first cooperation partner. Also, the camera (D) related to the device image 116 displayed at a position nearest to the device image 72 in the cooperation-partner display area 88 is set as the device as the second cooperation partner. Also, the display (E) related to the device image 118 displayed at a position nearest to the device image 116, among the device images other than the device image related to the device already set as a cooperation partner (for example, the device image 72) in the cooperation-partner display area 88, is set as the device as the third cooperation partner. The same applies to the order of cooperation of the other devices.

As described above, in a case where plural device images are displayed in the same cooperation-partner display area 88, the order of cooperation may be automatically set on the basis of the relationship in the display position among the device images, and thereby time and effort of a user may be saved, which may be convenient. Also in a case where plural device part images are displayed in the same cooperation-partner display area 88, the order of cooperation of the individual parts is determined through the process similar to that described above. Of course, a device part image may be displayed in the starting-point display area 86.

In the above-described exemplary embodiment and modification examples, a cooperative function may be a function that uses a combination of whole devices, may be a function that uses a combination of parts of devices, or may be a function that uses a combination of a whole device and a part of a device.

Alternatively, the functions according to the individual modification examples may be switched therebetween in accordance with an instruction from a user. For example, if the user provides an instruction to execute a function according to the first modification example, the function according to the first modification example may be executed and accordingly a starting-point display area and a cooperation-partner display area may be set on the device display screen. The same applies to the other modification examples. If the user provides an instruction to execute a function according to a modification example, the function according to the modification example is executed.

Figure 33:
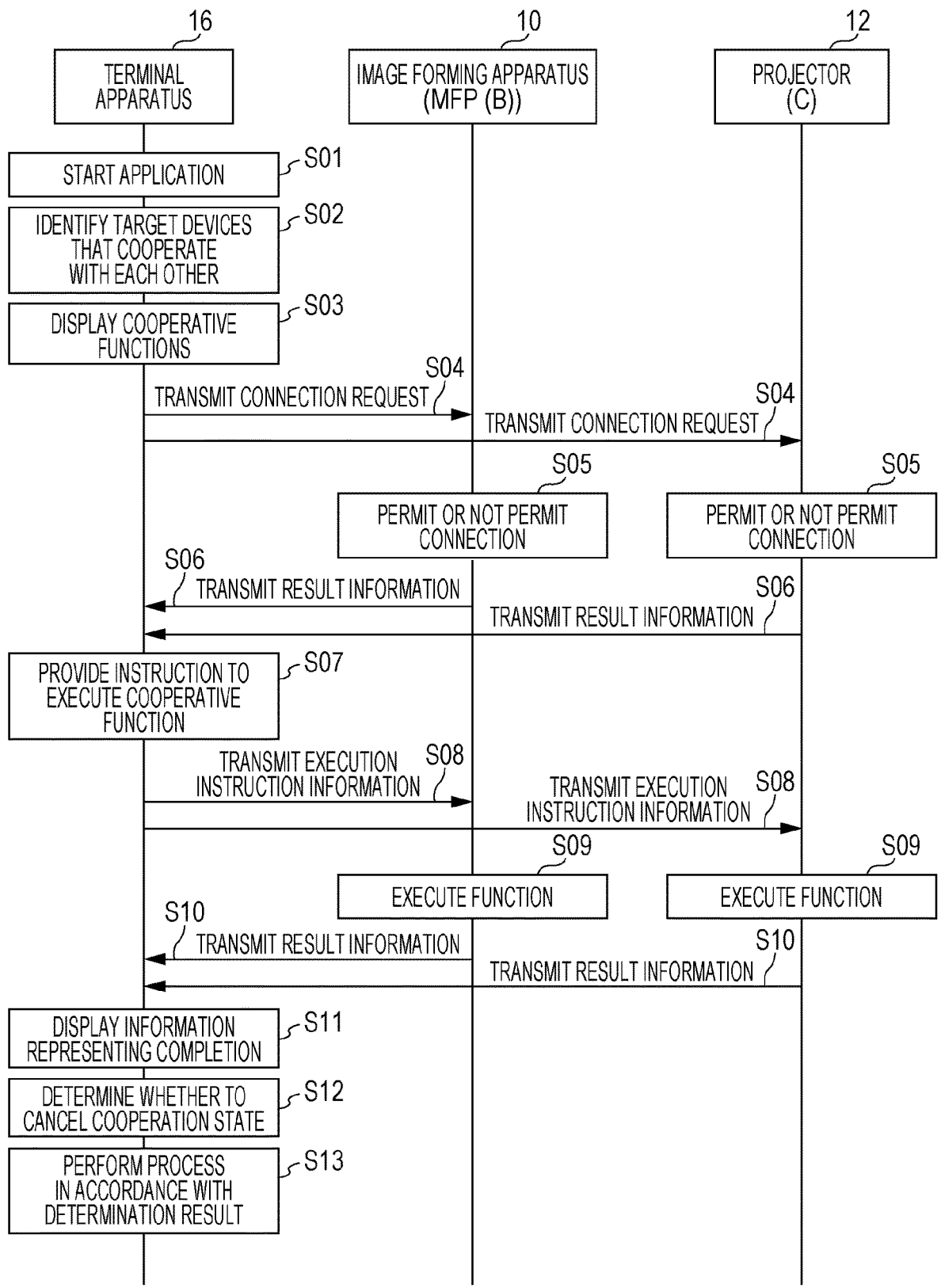
FIG. 33 is a sequence diagram illustrating a connection process performed in the image forming system.

Hereinafter, a description will be given of a process for executing a function of a device in the above-described exemplary embodiment and modification examples. As an example, a description will be given of a process for executing a cooperative function. In this case, a connection request is transmitted from the terminal apparatus 16 to target devices that cooperate with each other, and connections between the terminal apparatus 16 and the target devices are established. Hereinafter, the connection process will be described with reference to FIG. 33. FIG. 33 is a sequence diagram illustrating the process.

First, a user provides an instruction to start an application (program) for executing a cooperative function by using the terminal apparatus 16. In response to the instruction, the controller 48 of the terminal apparatus 16 starts the application (S01). The application may be stored in the memory 44 of the terminal apparatus 16 in advance or may be downloaded from the server 14 or the like.

Subsequently, the target devices that cooperate with each other are identified by applying the marker-based AR technology, the markerless AR technology, or the position information AR technology (S02). Of course, the target devices may be identified by using a technology other than the AR technologies. In the case of applying the marker-based AR technology or the markerless AR technology, the user photographs the target devices by using the camera 42 of the terminal apparatus 16. For example, in the case of using the image forming apparatus 10 (MFP (B)) and the projector 12 (projector (C)) as the target devices, the user photographs the image forming apparatus 10 and the projector 12 by using the camera 42. Accordingly, the pieces of device identification information of the image forming apparatus 10 and the projector 12 are obtained, and the image forming apparatus 10 and the projector 12 are identified as the target devices. In the case of applying the position information AR technology, the pieces of position information of the image forming apparatus 10 and the projector 12 are obtained, the pieces of device identification information of the image forming apparatus 10 and the projector 12 are specified on the basis of the pieces of position information, and the image forming apparatus 10 and the projector 12 are identified.

As described above, if plural devices are identified, if an instruction to display a cooperative function is provided, or if another device is identified before an instruction to execute a single-device function of one device is provided, a cooperative function that uses functions of the plural devices is identified. The information about the identified cooperative function is displayed on the UI unit 46 of the terminal apparatus 16 (S03). The process of identifying the cooperative function may be performed by the server 14 or the terminal apparatus 16.

Subsequently, after the user designates, by using the terminal apparatus 16, the target cooperative function to be executed, the terminal apparatus 16 transmits information representing a connection request to the target devices (for example, the image forming apparatus 10 and the projector 12) that execute the cooperative function (S04). For example, if the pieces of address information representing the addresses of the target devices that cooperate with each other are stored in the server 14, the terminal apparatus 16 obtains the pieces of address information from the server 14. If the pieces of address information are included in the pieces of device identification information, the terminal apparatus 16 may obtain the pieces of address information from the pieces of device identification information of the target devices. Alternatively, the pieces of address information of the target devices may be stored in the terminal apparatus 16. Of course, the terminal apparatus 16 may obtain the pieces of address information of the target devices by using another method. By using the pieces of address information of the target devices (for example, the image forming apparatus 10 and the projector 12), the terminal apparatus 16 transmits information representing a connection request to the target devices (for example, the image forming apparatus 10 and the projector 12).

The image forming apparatus 10 and the projector 12 that have received the information representing a connection request permit or do not permit the connection to the terminal apparatus 16 (S05). For example, if the image forming apparatus 10 and the projector 12 are devices that are not permitted to make a connection or if the number of devices to which a connection is requested exceeds an upper limit, the connection is not permitted. If the connection from the terminal apparatus 16 is permitted, an operation of changing setting information unique to the image forming apparatus 10 and the projector 12 may be prohibited so that the setting information is not changed by the terminal apparatus 16. For example, change of color parameters or setting time to shift to a power saving mode of the image forming apparatus 10 may be prohibited. Accordingly, the security for the target devices that cooperate with each other may increase. Alternatively, in the case of causing devices to cooperate with each other, change of setting information may be limited compared to the case of using each device alone without cooperation with another device. For example, change of fewer setting items may be permitted than in the case of using the device alone. Alternatively, viewing of personal information of other users, such as an operation history, may be prohibited. Accordingly, the security for personal information of users may increase.

Result information representing permission or non-permission of connection is transmitted from the image forming apparatus 10 and the projector 12 to the terminal apparatus 16 (S06). If the connection to the image forming apparatus 10 and the projector 12 is permitted, communication is established between the terminal apparatus 16 and each of the image forming apparatus 10 and the projector 12.

Subsequently, the user provides an instruction to execute the cooperative function by using the terminal apparatus 16 (S07). In response to the instruction, execution instruction information representing the instruction to execute the cooperative function is transmitted from the terminal apparatus 16 to the image forming apparatus 10 and the projector 12 (S08). The execution instruction information transmitted to the image forming apparatus 10 includes information representing the process to be executed in the image forming apparatus 10 (for example, job information), and the execution instruction information transmitted to the projector 12 includes information representing the process to be executed in the projector 12 (for example, job information).

In response to the execution instruction information, the image forming apparatus 10 and the projector 12 execute the individual functions in accordance with the execution instruction information (S09). For example, if the cooperative function includes a process of transmitting/receiving data between the image forming apparatus 10 and the projector 12, as in the function of transferring scan data from the image forming apparatus 10 (MFP (B)) to the projector 12 (projector C)) and projecting the data by the projector 12, communication is established between the image forming apparatus 10 and the projector 12. In this case, for example, the execution instruction information transmitted to the image forming apparatus 10 includes the address information of the projector 12, and the execution instruction information transmitted to the projector 12 includes the address information of the image forming apparatus 10. The communication is established between the image forming apparatus 10 and the projector 12 by using these pieces of address information.

After the execution of the cooperative function is finished, the information indicating that the execution of the cooperative function is completed is transmitted from the image forming apparatus 10 and the projector 12 to the terminal apparatus 16 (S10). The information indicating that the execution of the cooperative function is completed is displayed on the UI unit 46 of the terminal apparatus 16 (S11). If the information indicating that the execution of the cooperative function is completed is not displayed even when a predetermined period elapses from the time point at which the execution instruction is provided, the controller 48 of the terminal apparatus 16 may cause the UI unit 46 to display information representing an error, and may transmit execution instruction information or information representing a connection request to the image forming apparatus 10 and the projector 12 again.

Subsequently, the user determines whether or not to cancel the cooperation state of the image forming apparatus 10 and the projector 12 (S12), and a process is performed in accordance with the determination result (S13). In the case of cancelling the cooperation state, the user provides a cancellation instruction by using the terminal apparatus 16. Accordingly, the communication between the terminal apparatus 16 and each of the image forming apparatus 10 and the projector 12 is stopped. Also, the communication between the image forming apparatus 10 and the projector 12 is stopped. In the case of not cancelling the cooperation state, an execution instruction may be continuously provided.

Furthermore, the number of target devices that cooperate with each other may be increased. For example, the device identification information of the third device may be obtained, and a cooperative function to be executed through cooperation among the three devices including the image forming apparatus 10 and the projector 12 may be specified. The information indicating that the image forming apparatus 10 and the projector 12 have already been identified as the target devices that cooperate with each other is stored in the server 14 or the terminal apparatus 16.

The pieces of device identification information representing the target devices that cooperate with each other and the cooperative function identification information representing an executed cooperative function may be stored in the terminal apparatus 16 or the server 14. For example, the user account information (user identification information) of the user who uses the terminal apparatus 16 may be obtained, and history information representing the correspondence among the user account information, the pieces of device identification information representing the target devices that cooperate with each other, and the cooperative function identification information representing the executed cooperative function may be created and stored in the terminal apparatus 16 or the server 14. The history information may be created by the terminal apparatus 16 or the server 14. With reference to the history information, the cooperative function that has been executed and the devices used for the cooperative function are specified.

The target devices that cooperate with each other (for example, the image forming apparatus 10 and the projector 12) may store, as history information, the user account information of the user who has requested connection and the terminal identification information representing the terminal apparatus 16 that has requested connection. With reference to the history information, the user who has used the devices is specified. The user may be specified by using the history information in the case of, for example, specifying the user who was using a device when the device was broken, or performing a charging process for consumables or the like. The history information may be stored in the server 14 or the terminal apparatus 16 or may be stored in another apparatus.

The user account information is stored, for example, in the memory 44 of the terminal apparatus 16 in advance. The controller 48 of the terminal apparatus 16 functions as an example of a user identifying unit, reads the user account information of the user from the memory 44, and identifies the user who uses the terminal apparatus 16. If the pieces of user account information of plural users are stored in the memory 44, the user designates his/her user account information by using the terminal apparatus 16. Accordingly, the user account information of the user is read and the user is identified. Alternatively, the controller 48 of the terminal apparatus 16 may identify the user by reading the user account information of the user who is logged in to the terminal apparatus 16. Alternatively, if only one piece of user account information is stored in the same terminal apparatus 16, the controller 48 of the terminal apparatus 16 may identify the user by reading the one piece of user account information. If a user account is not set and if user account information is not created, initial setting is performed and thereby user account information is created.

Usage histories of cooperative functions may be managed for individual users, and the information representing the cooperative functions previously used by the user represented by read user account information may be displayed on the UI unit 46 of the terminal apparatus 16. The information representing the usage history may be stored in the terminal apparatus 16 or the server 14. Also, the information representing a cooperative function that is used at a predetermined frequency or more may be displayed. With such a shortcut function being provided, a user operation regarding a cooperative function may be simplified.

In a case where a single-device function is executed, information representing an instruction to execute the single-device function is transmitted from the terminal apparatus 16 to the device that executes the single-device function. The device executes the single-device function in accordance with the instruction.

Each of the image forming apparatus 10, the server 14, and the terminal apparatus 16 is implemented through cooperation between hardware resources and software resources, for example. Specifically, each of the image forming apparatus 10, the server 14, and the terminal apparatus 16 includes one or plural processors, such as a central processing unit (CPU), which are not illustrated. The one or plural processors read and execute a program stored in a storage apparatus (not illustrated), and thereby the functions of the individual units of the image forming apparatus 10, the server 14, and the terminal apparatus 16 are implemented. The program is stored in the storage apparatus through a recording medium, such as a compact disc (CD) or a digital versatile disc (DVD), or through a communication path, such as a network. Alternatively, the individual units of the image forming apparatus 10, the server 14, and the terminal apparatus 16 may be implemented by hardware resources such as a processor or an electronic circuit. An apparatus such as a memory may be used for the implementation. Alternatively, the individual units of the image forming apparatus 10, the server 14, and the terminal apparatus 16 may be implemented by a digital signal processor (DSP) or a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller configured to control display of a function of one device if the one device is photographed and that controls display of a cooperative function that uses functions of a plurality of devices if the plurality of devices are photographed,
wherein the cooperative function uses a first function of a first device among the plurality of devices and a second function of a second device among the plurality of devices,
wherein the first function is different from the second function, and wherein the controller is configured to, in response to the second device being photographed after an image of the first device is removed from a display, control display of the cooperative function that uses the first function and the second function.

2. The information processing apparatus according to claim 1, wherein the controller is configured to, in response to the first device being photographed and subsequently the second device being photographed within a period in which an instruction to execute a function of the first device is not provided, control display of the cooperative function that uses the first function and the second function.

3. The information processing apparatus according to claim 1, wherein the controller is configured to, in response to the plurality of devices being photographed within a predetermined period, control display of the cooperative function.

4. The information processing apparatus according to claim 1, wherein, if the plurality of devices are photographed, the controller controls display of functions of individual devices included in the plurality of devices and also controls display of the cooperative function.

5. The information processing apparatus according to claim 1, wherein, if the plurality of devices are photographed and if an instruction to display a single-device function is provided by a user, the controller controls display of functions of individual devices included in the plurality of devices, and if an instruction to display the cooperative function is provided by the user, the controller controls display of the cooperative function.

6. The information processing apparatus according to claim 1, wherein, if a part of the one device is photographed, the controller controls display of a function assigned to the part.

7. The information processing apparatus according to claim 1, wherein, if the controller controls display of the cooperative function and if a part of a device included in the plurality of devices is photographed, the controller controls display of the cooperative function that uses a function assigned to the part.

8. The information processing apparatus according to claim 1, wherein, if a whole of the one device is photographed, the controller controls display of one or a plurality of functions of the one device, and if a part of the one device is photographed, the controller controls display of a function assigned to the part.

9. The information processing apparatus according to claim 1, wherein in response to the plurality of devices being photographed, a plurality of images related to the plurality of devices are displayed on a display, and the controller is configured to control display of the cooperative function, the cooperative function varying in accordance with display positions of the plurality of images on the display.

10. The information processing apparatus according to claim 9, wherein the controller is configured to control display of a cooperative function in which a device related to an image displayed in a predetermined area among the plurality of images displayed on the display is a starting point.

11. The information processing apparatus according to claim 10, wherein the controller is configured to, in response to an image related to a part of a device being displayed in the predetermined area, control display of a cooperative function in which a function assigned to the image related to the part is a starting point.

12. The information processing apparatus according to claim 10, wherein the controller is configured to control display of an edit screen for displaying an image related to a photographed device in the predetermined area.

13. The information processing apparatus according to claim 9, wherein an order in which the individual devices are used in the cooperative function is changed in accordance with the display positions of the plurality of images related to the plurality of devices.

14. The information processing apparatus according to claim 9, wherein an order in which data is moved between the individual devices used in the cooperative function is changed in accordance with the display positions of the plurality of images related to the plurality of devices.

15. The information processing apparatus according to claim 1, wherein, if the plurality of devices are photographed, a device to be used as a starting point of the cooperative function is changed in accordance with a positional relationship between the plurality of devices and a photographing apparatus that performs photography.

16. The information processing apparatus according to claim 15, wherein a device nearer to the photographing apparatus is given a higher priority in being used as a device at a starting point of the cooperative function.

17. The information processing apparatus according to claim 15, wherein a device related to an image displayed nearer to a reference position set on a display screen on which images are displayed is given a higher priority in being used as a device at a starting point of the cooperative function.

18. The information processing apparatus according to claim 15, wherein the positional relationship is determined based on a relationship in a missing portion between appearance images related to individual devices included in the plurality of devices.

19. The information processing apparatus according to claim 15, wherein the controller causes a display to preferentially display the cooperative function that uses a function of the device at the starting point.

20. The information processing apparatus according to claim 15, wherein the controller causes a display to display information corresponding to an order of positions near the photographing apparatus in association with individual devices included in the plurality of devices.

21. The information processing apparatus according to claim 1, wherein the controller is configured to, in response to the plurality of devices being photographed, control display of functions of individual devices included in the plurality of devices or display of a cooperative function that uses functions of the plurality of devices in accordance with display positions of a plurality of images related to the plurality of devices.

22. The information processing apparatus according to claim 1, wherein, if an appearance image related to a photographed device does not satisfy a predetermined area standard, the device is not identified as a target device to be used.

23. The information processing apparatus according to claim 22, wherein the appearance image does not satisfy the area standard if the appearance image has a missing portion behind an obstacle.

24. The information processing apparatus according to claim 1, wherein, if display of the cooperative function is controlled and if an appearance image related to a photographed device represents only a part of the device, a function assigned to an image related to the part is used in the cooperative function.

25. The information processing apparatus according to claim 1, further comprising:
an identifying unit configured to identify, based on an image of a device obtained through photography performed by a photographing unit, the device photographed by the photographing unit,
wherein the controller is configured to, in response to the one device being identified by the identifying unit, control display of the function of the one device, and in response to the plurality of devices being identified by the identifying unit, control display of the cooperative function that uses the functions of the plurality of devices.

26. A non-transitory computer readable medium storing a program causing a computer to execute a process, the process comprising:
controlling display of a function of one device if the one device is photographed and controlling display of a cooperative function that uses functions of a plurality of devices if the plurality of devices are photographed,
wherein the cooperative function uses a first function of a first device among the plurality of devices and a second function of a second device among the plurality of devices, and
wherein the first function is different from the second function,
wherein the process further comprises controlling, in response to the second device being photographed after an image of the first device is removed from a display, display of the cooperative function that uses the first function and the second function.

* * * * *